(12) United States Patent
Kim et al.

(10) Patent No.: US 11,651,621 B2
(45) Date of Patent: May 16, 2023

(54) ELECTRONIC DEVICE AND METHOD FOR CONTROLLING THE ELECTRONIC DEVICE

(71) Applicant: SAMSUNG ELECTRONICS CO., LTD., Suwon-si (KR)

(72) Inventors: Jungwook Kim, Suwon-si (KR); Jaedeok Kim, Suwon-si (KR); Juyong Song, Suwon-si (KR); Junho Rim, Suwon-si (KR); Jaewook Shin, Suwon-si (KR); Aeran Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 17/035,986

(22) Filed: Sep. 29, 2020

(65) Prior Publication Data

US 2021/0124909 A1 Apr. 29, 2021

Related U.S. Application Data

(60) Provisional application No. 62/924,853, filed on Oct. 23, 2019.

(30) Foreign Application Priority Data

Dec. 4, 2019 (KR) ........................ 10-2019-0160075

(51) Int. Cl.
*G06V 40/16* (2022.01)
*G06F 9/451* (2018.01)
*G06F 18/231* (2023.01)

(52) U.S. Cl.
CPC ............ *G06V 40/168* (2022.01); *G06F 9/451* (2018.02); *G06F 18/231* (2023.01); *G06V 40/172* (2022.01)

(58) Field of Classification Search
CPC ........ G06N 3/04; G06N 3/0481; G06N 3/082; G06N 3/0445; G06N 3/084; G06N 3/088;
(Continued)

(56) References Cited

U.S. PATENT DOCUMENTS 7,043,075 B2 5/2006 Gutta
9,710,760 B2 7/2017 Hill et al.
(Continued)

FOREIGN PATENT DOCUMENTS

CN 110013197 A 7/2019
JP 6726442 B2 7/2020
(Continued)

OTHER PUBLICATIONS

International Search Report (PCT/ISA/210) dated Jan. 6, 2021 by the International Searching Authority in counterpart International Patent Application No. PCT/KR2020/013711.
(Continued)

*Primary Examiner* — Ruiping Li
(74) *Attorney, Agent, or Firm* — Sughrue Mion, PLLC

(57) ABSTRACT

The electronic device includes a camera, a non-volatile memory storing at least one instruction and a plurality of object recognition models, a volatile memory, and a processor, connected to the non-volatile memory, the volatile memory, and the camera, and configured to control the electronic device. The processor, by executing the at least one instruction, is configured to, based on an operation mode of the electronic device, load, to the volatile memory, a hierarchical object recognition model having a hierarchical structure corresponding to the operation mode, the hierarchical object recognition model including objection recognition models among the plurality of object recognition models, obtain information on an object by inputting an object image obtained through the camera to the hierarchical
(Continued)

object recognition model, and determine an operation of the electronic device based on the information on the object.

20 Claims, 16 Drawing Sheets

(58) Field of Classification Search
CPC ............ G06N 3/10; G06N 5/04; G06V 10/82; G06V 10/751; G06V 40/172; G06V 10/22; G06V 10/25; G06V 20/20; G06V 40/16; G06V 40/168; G06T 1/0014; G06K 9/00536; G06K 9/6219; G06K 9/6227; G06K 9/6253; G06K 9/6256; G06K 9/6262; G06K 9/6271; G06K 9/6288; G06K 9/6293
See application file for complete search history.

(56) References Cited

U.S. PATENT DOCUMENTS

| | | |
|---|---|---|
| 10,558,912 B2 | 2/2020 | Kwak et al. |
| 11,151,357 B2 | 10/2021 | Kim et al. |
| 2007/0179918 A1 | 8/2007 | Heisele et al. |
| 2010/0135530 A1 | 6/2010 | Kao et al. |
| 2015/0078655 A1 | 3/2015 | Lu et al. |
| 2016/0196286 A1 | 7/2016 | Kim et al. |
| 2017/0039720 A1 | 2/2017 | Yoo et al. |
| 2018/0121748 A1 | 5/2018 | Kwak et al. |
| 2019/0102646 A1 | 4/2019 | Redmon et al. |
| 2019/0102667 A1 | 4/2019 | Bashkirov et al. |
| 2019/0213438 A1* | 7/2019 | Jones ................. G06K 9/6274 |
| 2020/0050842 A1* | 2/2020 | Kim ..................... G06V 40/10 |
| 2020/0380242 A1 | 12/2020 | Kim et al. |

FOREIGN PATENT DOCUMENTS

| | | |
|---|---|---|
| KR | 10-2017-0135758 A | 12/2017 |
| KR | 10-2063150 B1 | 1/2020 |
| KR | 10-2254138 B1 | 5/2021 |
| KR | 10-2308871 B1 | 10/2021 |
| WO | 2018/117704 A1 | 6/2018 |

OTHER PUBLICATIONS

Written Opinion (PCT/ISA/237) dated Jan. 6, 2021 by the International Searching Authority in counterpart International Patent Application No. PCT/KR2020/013711.

Communication dated Jun. 20, 2022, issued by the European Patent Office in counterpart European Application No. 20879911.4.

* cited by examiner

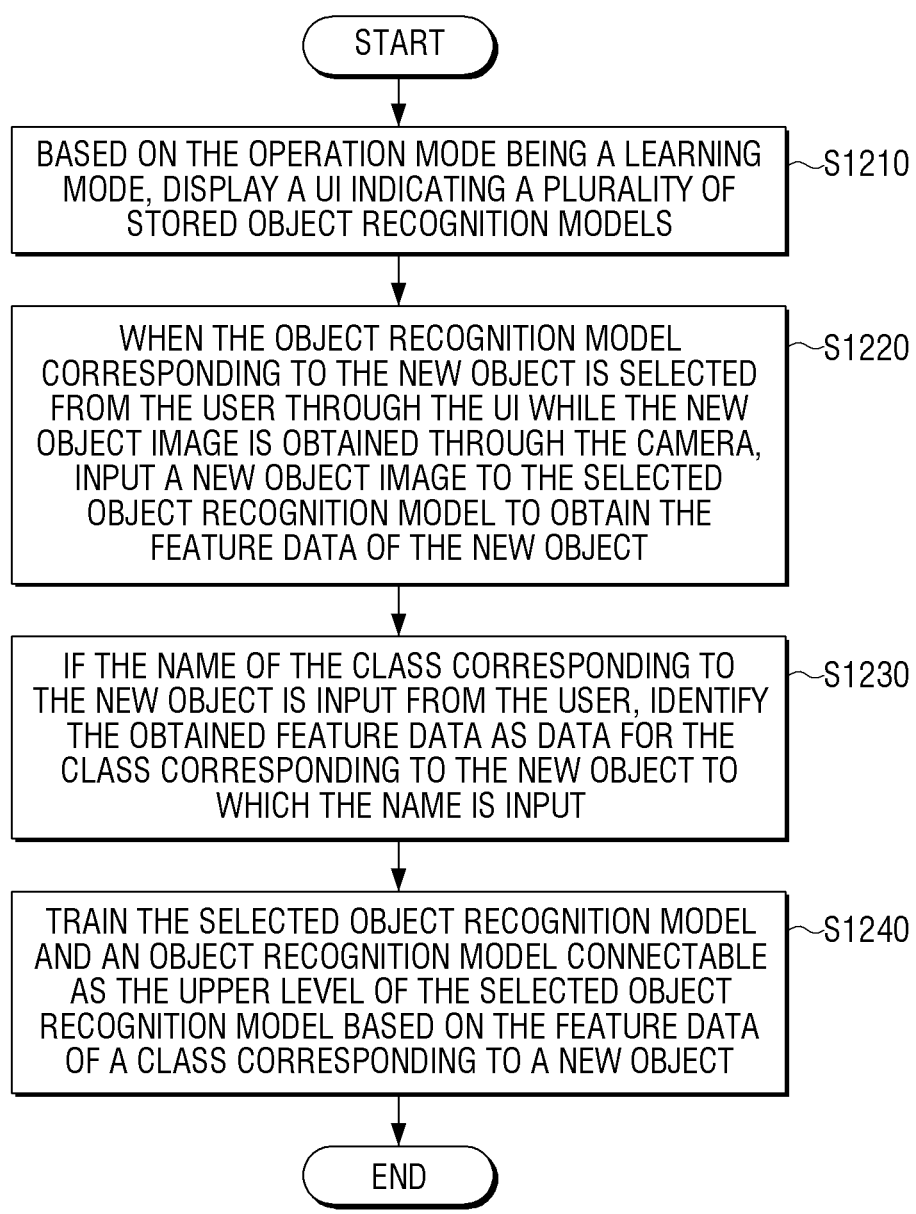

ELECTRONIC DEVICE AND METHOD FOR CONTROLLING THE ELECTRONIC DEVICE

CROSS-REFERENCE TO RELATED APPLICATION(S)

This application is based on and claims priority under 35 U.S.C. § 119 to Korean Patent Application No. 10-2019-0160075, filed on Dec. 4, 2019, in the Korean Intellectual Property Office, and is also based on and claims benefit of U.S. Provisional Patent Application No. 62/924,853, filed on Oct. 23, 2019, the disclosures of which are incorporated by reference herein in their entireties.

BACKGROUND

1. Field

The disclosure relates to an electronic device and a method for controlling the electronic device and, more particularly, to an electronic device capable of operating an object recognition model having a hierarchical structure that may be configured in various manners according to an operation mode of an electronic device.

2. Description of Related Art

As a function of an electronic device utilizing an object recognition technology is advanced, the number of objects to be recognized by an electronic device is increasing. Accordingly, various object recognition technologies using artificial intelligence (AI) models have been studied and developed.

In the related art, the technology of recognizing an object through an artificial intelligence model is used and as the number of objects to be recognized increases, a size of a memory and a consumption amount of calculation continuously increase. In the related art, when the object recognition is performed, an entire artificial intelligence model, not only a specific model in accordance with a certain circumstance, is loaded on a memory, there is a disadvantage that the memory is used inefficiently.

As a result, there is a limitation in the object recognition capability of a user device which might have limitations in memory, computational capability, and communication capability by only improving the functionality of one artificial intelligence model itself.

SUMMARY

Provided are an electronic device for selecting and combining at least one recognition model having a hierarchical structure corresponding to an operation mode determined in an electronic device to be loaded into a volatile memory, and determining an operation to be performed through a selected and combined recognition model having the hierarchical structure loaded in the memory, and a control method thereof.

Additional aspects will be set forth in part in the description which follows and, in part, will be apparent from the description, or may be learned by practice of the presented embodiments.

In accordance with an aspect of the disclosure, an electronic device includes a camera, a non-volatile memory storing at least one instruction and a plurality of object recognition models, a volatile memory, and a processor, connected to the non-volatile memory, the volatile memory, and the camera, configured to control the electronic device, and the processor, by executing the at least one instruction, is configured to, based on an operation mode of the electronic device being determined, load, to the volatile memory, at least one object recognition model with a hierarchical structure corresponding to the determined operation mode, among the plurality of object recognition models, obtain information on the object by inputting an object image obtained through the camera to the loaded object recognition model, and determine an operation of the electronic device based on the information on the object.

In accordance with an aspect of the disclosure, there is provided a method of controlling an electronic device including a volatile memory and a non-volatile memory storing a plurality of object recognition models, the method includes, based on an operation mode of the electronic device being determined, loading, to the volatile memory, at least one object recognition model with a hierarchical structure corresponding to the determined operation mode, among the plurality of object recognition models; obtaining information on the object by inputting an object image obtained through the camera to the loaded object recognition model; and determining an operation of the electronic device based on the information on the object.

BRIEF DESCRIPTION OF THE DRAWINGS

The above and/or other aspects, features, and advantages of certain embodiments of the present disclosure will be more apparent from the following description taken in conjunction with the accompanying drawings, in which:

FIG. 12 is a flowchart illustrating a method of learning of an electronic device according to an embodiment.

DETAILED DESCRIPTION

According to an embodiment, an electronic device identifies level information according to a requested operation mode, loads a recognition model corresponding to a layered model structure from a top level among the entire model structures to the identified level by using a layered entire model structure having a plurality of levels stored in a non-volatile memory and level information corresponding to each operation mode, and performs the operation mode by using the loaded recognition model.

According to an embodiment, a method for constructing a recognition model is provided, and the electronic device identifies configuration information of hierarchical structure template information and a hierarchical structure corresponding to a requested operation mode, loads a recognition model corresponding to a layered model structure configured to link a specific level of the hierarchical structure to a specific level of the hierarchical structure according to configuration information of the hierarchical structure template information and the hierarchical structure, and performs the operation mode by using the loaded recognition model.

In a method for constructing a recognition model according to an embodiment, an electronic device is loaded with a layered recognition model composed of a plurality of levels in a volatile memory, and a sub-model in each level includes a feature extraction unit for extracting a feature value of input source data and a classifier for classifying the feature value on a specific reference, wherein the feature extraction unit of the upper level model is activated and the feature extraction unit of the lower level model is deactivated, so that the extraction value output from the sub-model of the upper level may be used as it is in the model of the lower level.

In a method for configuring a recognition model according to an embodiment, when a new class is added to a layered recognition model composed of a plurality of levels, a specific sub-model of a specific location level to which the new class is added may be determined by a user-defined or feature similarity comparison method, and the determined sub-model and at least an upper level and a top-level sub-model linked in association with the determined sub-model may be updated.

Hereinafter, embodiments will be described in detail with reference to the accompanying drawings.

Figure 1A:
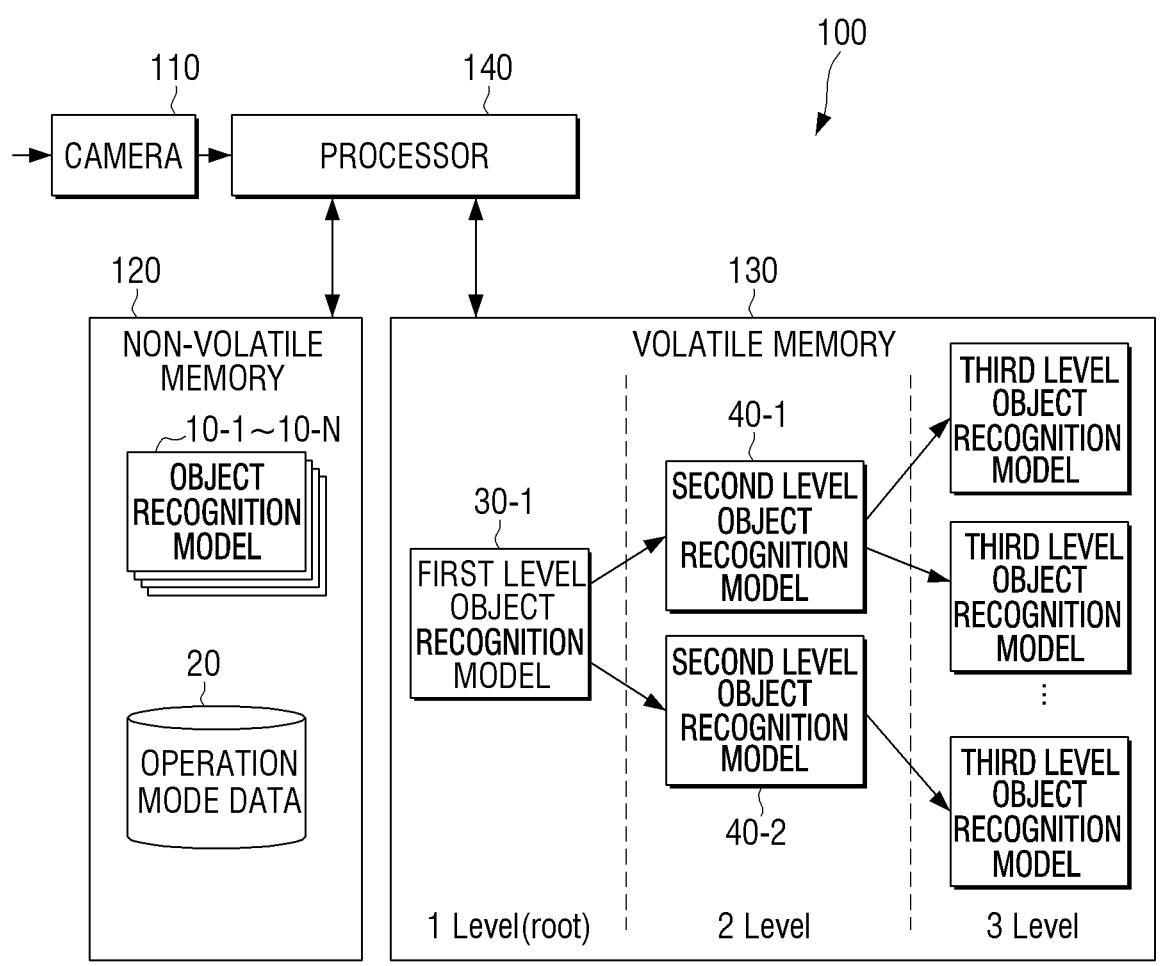
FIGS. 1A, 1B, 1C, 1D, and 1E are diagrams illustrating a configuration and an operation of an electronic device for loading an object recognition model having a hierarchical structure to a volatile memory according to an embodiment.

FIG. 1A is a diagram illustrating a configuration and an operation of an electronic device 100 which loads an object recognition module having a hierarchical structure to a volatile memory 130.

As illustrated in FIG. 1A, the electronic device 100 according to an embodiment may include a camera 110, a non-volatile memory 120, a volatile memory 130, and a processor 140. FIG. 1A is an exemplary diagram of an embodiment, and hardware and software configurations may be additionally included in the electronic device 100, as deemed appropriate by those skilled in the art.

The camera 110 is configured to obtain one or more images of the periphery of the electronic device 100. In an embodiment, the camera 110 may capture an object present in the periphery of the electronic device 100 to obtain an image of the object. As used herein, "an image for an object" is an image of an object around the electronic device 100 obtained through the camera 110, and is used to refer to an image of an object input to the object recognition model.

The camera 110 may include a plurality of cameras, and may be variously implemented with a red-green-blue (RGB) camera, a three-dimensional (3D) camera, a depth camera, or the like. The camera 110 may be located in front of the electronic device 100, but this is not limiting, and may be located at the rear part, the upper part, or the like, of the electronic device 100. The camera 110 may be located outside of the electronic device 100 and electrically or communicatively connected thereto.

The non-volatile memory 120 refers to a memory capable of maintaining stored information even though power supply is stopped. For example, the non-volatile memory 120 may include at least one of a flash memory, a programmable read-only memory (PROM), a magnetoresistive random-access memory (MRAM), and a resistive RAM (RRAM).

The volatile memory 130 refers to a memory requiring continued power supply to maintain stored information. For example, the volatile memory 130 may include at least one of a dynamic random-access memory (DRAM) or a static RAM (SRAM).

In an embodiment, it is assumed that the volatile memory 130 is a configuration separate from the processor 140, but this is merely to describe an operation of the electronic device 100, and the volatile memory 130 according to an embodiment may be implemented as a component included in the processor 140.

The non-volatile memory 120 according to an embodiment may store at least one instruction, a plurality of object recognition models 10-1 to 10-N, and operation mode data 20. The instruction is one action statement for the electronic device 100 as a programming language, and is a minimum unit of programs that the electronic device 100 may execute directly.

Each of the plurality of object recognition models 10-1 to 10-N is an artificial intelligence model capable of outputting information on an object using an image of the object obtained through the camera 110. The object recognition model may output feature data of the object by using the object image, and output information on the object based on the feature data of the output object. The information on the object may include information about into which class among the predetermined classes the object is classified. A class is a collection of objects that have the same or similar attributes. Each of the plurality of object recognition models 10-1 to 10-N may store data for a class for classifying an object into a predetermined class.

As illustrated in FIG. 1A, a plurality of object recognition models may be separately stored in the non-volatile memory 120, but this is not limiting, and an object recognition model having a plurality of hierarchical structures may be stored in the non-volatile memory 120. An object recognition model having a fixed hierarchical structure is a model in which at least one individual object recognition model may classify a specific object into one of a predetermined class while forming a hierarchical structure, and may be variously implemented according to the type of the electronic device 100. The hierarchical structure (or a tree structure) denotes a data structure in which an upper node may have one or more lower nodes, but a lower node needs to have one upper node.

The operation mode data 20 may include information associated with a hierarchical structure corresponding to each of a plurality of operation modes of the electronic device 100. In an embodiment, the operation mode data 20 may include information about the number of levels of the hierarchical structure corresponding to each operation mode, the type of object recognition model that may be placed at each level of the hierarchical structure corresponding to each operation mode, and the association relationship between the object recognition models. The association relationship between the object recognition models may denote a connection relationship between object recognition models that may be disposed at a specific level and a lower level of the specific level among the hierarchical structure. Accordingly, information about the association relation between object recognition models may include information about a model that may be connected as child nodes of a specific level of the object recognition model.

The operation mode data 20 may be set up as relational database, but this is merely an example and is not limiting. For example, the operation mode data 20 may be set up as Table 1 below.

TABLE 1

| | Third operation mode |
|---|---|
| Number of levels | 3 |
| Types of model deployable at each level | {L1: (A), L2: (B, C), L3: (D, E)} |
| Association relationship among models | Model connected to B as a child node: D<br>Model connected to C as a child node: E |

Figure 1B:
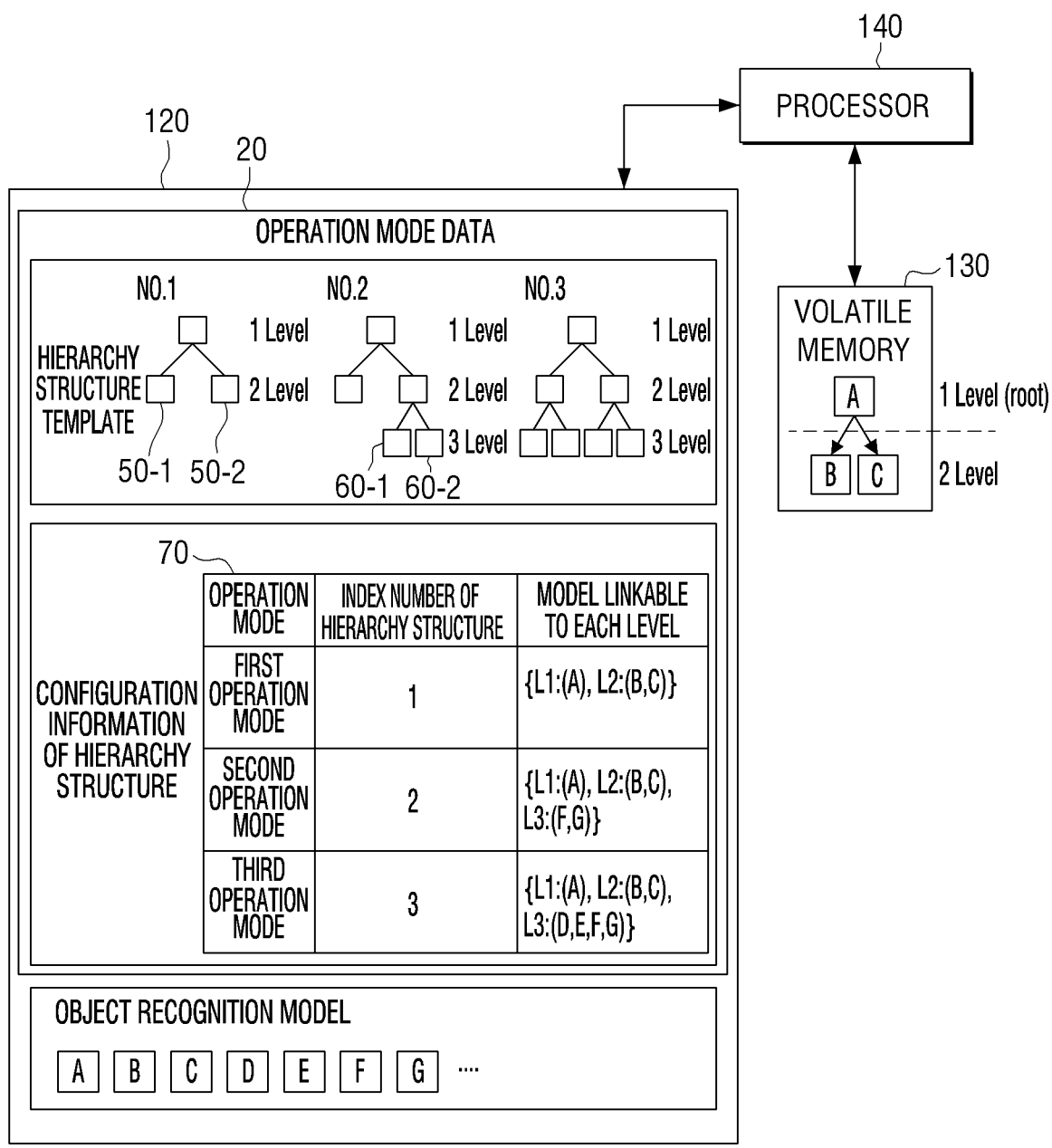

The operation mode data 20 constructed as shown in Table 1 may include the information that the number of levels of the hierarchical structure corresponding to the third operation mode is 3, among the plurality of operation modes of the electronic device, an A object recognition model may be disposed at the first level, B and C at the second level, D and E at the third level, the model connected as the child node of B is D, and the model connected as the child node of C is E. The number of levels is 3 may denote that the hierarchical structure is configured from a first level which is a root level to a third level. In an embodiment, the operation mode data 20 may include a plurality of hierarchical templates, an index number capable of identifying each hierarchical template, and configuration information 70 of a hierarchical structure corresponding to the operation mode, as shown in FIG. 1B. A hierarchical template is a template that has a form of a hierarchy so that a plurality of object recognition models may be linked to a particular node. For example, as shown in FIG. 1B, the operation mode data 20 may include information that an index number of the hierarchical template in which two second level nodes 50-1 and 50-2 are connected to the first level node is number 1, and that an index number of hierarchical template in which two third level nodes 60-1, 60-2 are connected to the right node 50-2 among the second level nodes of the hierarchical template having the index number of 1 is number 2, or the like. The hierarchical template may be added, deleted, and/or modified based on the user command. The link may refer to the act of placing the object recognition model to a particular node location of a particular level of the hierarchical template.

The configuration information 70 of the hierarchical structure may include the index number of the hierarchical structure template corresponding to each operation mode and information on the type of the object recognition model that may be linked to each level of the hierarchical template having the index number. The configuration information of the hierarchical structure may be constructed as a relational database as shown in FIG. 1B, but this is not limiting.

For example, as shown in FIG. 1B, the configuration information of the hierarchical structure may include information that the index number of the hierarchical template corresponding to the first operation mode is 1, the object recognition model A may be linked to the first level node of the first hierarchical structure template, and B is linked to the second level node 50-1 connected to a left branch of the first level, and C is linked to the second level node 50-2 connected to the right branch. For example, the configuration information of the hierarchical structure may include the information that the index number of the hierarchical structure template corresponding to the second operation mode is 2, the A object recognition model may be loaded in the first level node, B and C object recognition models may be loaded in the second level nodes 50-1, 50-2 from the right, and F, G object recognition models may be loaded in the third level nodes 60-1 and 60-2 from the right, respectively.

As an embodiment, the processor 140 may control an overall operation of the electronic device by performing at least one instruction. The processor 140 may be connected to the camera 110, the non-volatile memory 120, and the volatile memory 130 for controlling overall operation of the electronic device 100. In an embodiment, the processor 140 may be one or a plurality of processors. The one or a plurality of processors 140 may be a general-purpose processor such as a central processing unit (CPU), an application processor (AP), a graphics-only processor such as a graphics processing unit (GPU), a vision processing unit (VPU), an AI-only processor such as a neural network processing unit (NPU), or the like.

In particular, the processor 140 may construct at least one object recognition model having a hierarchy corresponding to the determined operation mode among the plurality of object recognition models in a variety of ways using the operation mode data 20 stored in the non-volatile memory 120. As shown in FIG. 1A, the processor 140 may load at least one object recognition model having the configured hierarchical structure into the volatile memory 130. Loading refers to an operation in which data stored in the non-volatile memory 120 is retrieved and stored in the volatile memory 130 for the access of the processor 140.

In an embodiment, the processor 140 may construct an object recognition model having a hierarchical structure based on a template of the hierarchy identified through the operation mode data 20, an index number capable of identifying each hierarchical structure template, and configuration information of the hierarchical structure. For example, if the operation mode of the electronic device 100 is determined to be in the first mode of operation, the processor 140 may identify that the index number of the hierarchical template corresponding to the first mode of operation via the configuration information of the hierarchical structure of the operation mode data 20 is 1, and in the first level of the first hierarchical template, an A object recognition model may be linked, and B and C may be linked to the second level. As illustrated in FIG. 1B, the processor 140 may construct an object recognition model having a hierarchical structure by linking a model called A to a first level of the first hierarchical structure template, and linking B and C models to the A model as the second level, and may load the configured object recognition model into the volatile memory 130.

In an embodiment, the processor 140 may construct an object recognition model having a hierarchical structure based on information on the number of levels of hierarchical structure corresponding to the operation modes identified via the operation mode data 20 stored in the non-volatile memory 120, the type of object recognition model that may be placed at each level of the hierarchy, and the association relationship between the object recognition models. For example, as shown in Table 1 above, if the operation mode of the electronic device 100 is determined as the third mode of operation, the processor 140 may identify that the number of levels of the hierarchy corresponding to the third mode of operation via the operation mode data 20 is three, and may identify the type of object recognition model that may be placed at the first through third levels and the associated relationship information of each object recognition model (e.g., information about the object recognition model connected as a child node of each of the second levels of object recognition model) when in the third operation mode.

Figure 1C:
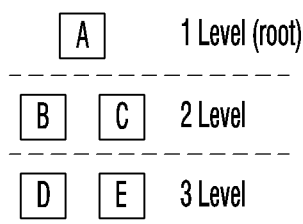
Figure 1D:
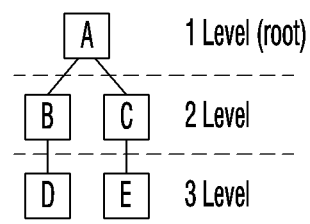

As shown in FIG. 1C, the processor 140 may arrange the object recognition models for each level using the number of levels (e.g., 3) corresponding to the identified third operation mode and the type of object recognition model that may be placed at each level (e.g., A at the first level, B and C at the second level, and D and E at the third level). As shown in FIG. 1D, the processor 140 may construct an object recognition model having a hierarchical structure by connecting the object recognition model arranged for each level to a branch using information on an association relation between the identified object recognition models. The processor 140 may then load the configured object recognition model into the volatile memory 130.

Figure 1E:
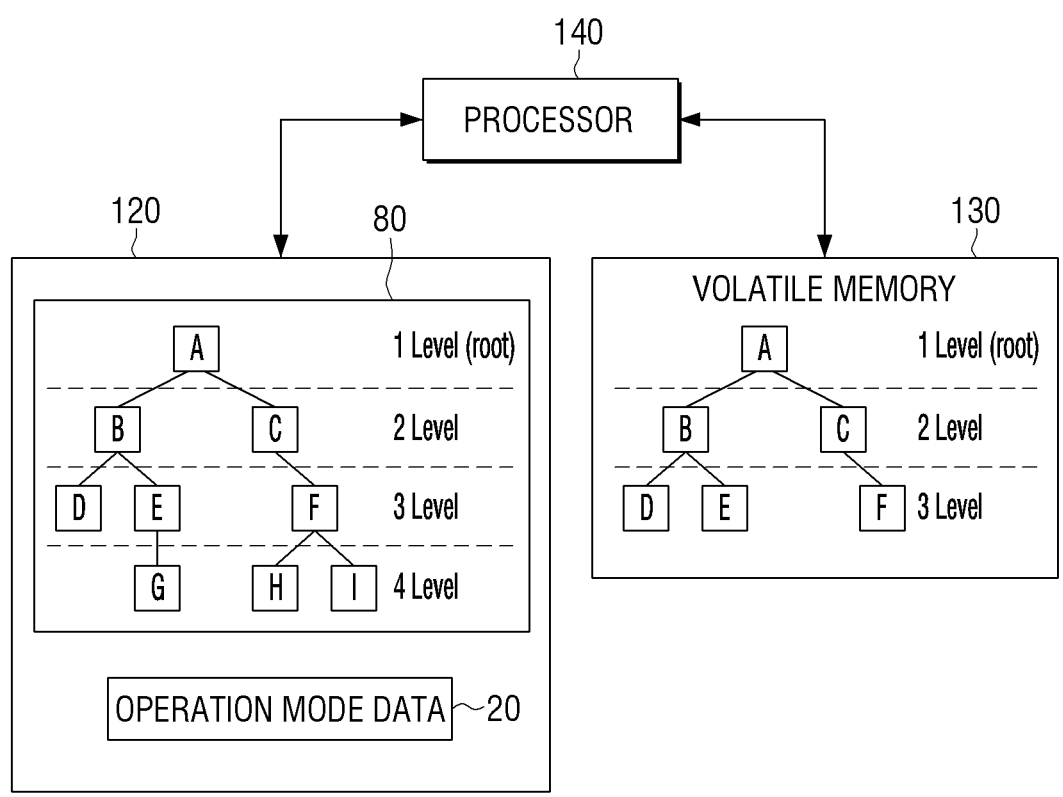

In an embodiment, once the operation mode of the electronic device 100 is determined, the processor 140 may load the object recognition model having a plurality of fixed hierarchical structure stored in the non-volatile memory 120 and the object recognition model having a hierarchical structure corresponding to the operation mode based on the operation mode data 20 to the volatile memory 130. Specifically, when the operation mode of the electronic device 100 is determined, the processor 140 may identify the level of the hierarchical structure corresponding to the operation mode determined through the operation mode data 20 constructed as shown in Table 1 above. The processor 140 may load the object recognition model which is layered up to the same level as the number of levels identified from the first level, among the object recognition model having a fixed hierarchical structure, to the volatile memory 130. If the root node is implemented at a zero level, the processor 140 may load the layered object recognition model into the volatile memory 130 from a first level to a level less than the number of total levels of the object recognition model having a fixed hierarchy. In an embodiment, as shown in FIG. 1E, the non-volatile memory 120 may be stored with an object recognition model 80 having a fixed hierarchy. If the operation mode of the electronic device 100 is determined to be in the third operation mode, the processor 140 may identify that the level number of the hierarchical structure corresponding to the third operation mode is 3 through the operation mode data 20. The processor 140 may then load the layered recognition model from a first level of the hierarchy consisting of a total of four levels to the third level, into the volatile memory 130. According to the above-described method, if only the number of the levels corresponding to the operation mode is identified without having to separately configure the hierarchical structure, the processor 140 may load the object recognition model having the hierarchical structure corresponding to the operation mode into the volatile memory 130.

In an embodiment, the processor 140 may input the object image obtained through the camera 110 to the loaded object recognition model to obtain feature data for the object. The processor 140 may obtain feature data of an object by inputting an object image into an object recognition model (or an object recognition model corresponding to a root node on a hierarchical structure) among the object recognition model having a hierarchical structure. The feature data of the object may be implemented in a form of a vector, but this is not limiting and may be variously implemented as a matrix, a graph, or the like. The processor 140 may obtain information on the object based on the feature data of the object. The information for the object may include information about into which class the object is classified, among preset classes.

The processor 140 may identify an object recognition model to input feature data of an object among the object recognition models of a lower level based on the obtained information on the object. Specifically, when information that an object is classified into a first class is obtained through an object recognition model of an upper level, the processor 140 may identify the object recognition model corresponding to the first class as an object recognition model of a lower level to input the feature data of the object. For example, referring to FIG. 1A, when an object recognition model 30-1 of a first level among an object recognition model having a hierarchical structure loaded in the volatile memory 130 obtains information about an object (e.g., information that an object has been classified as a first class), the processor 140 may identify an object recognition model corresponding to a first class among the plurality of second level object recognition models 40-1 and 40-2 through the obtained information on the object. The processor 140 may input feature data of the object to the identified object recognition model corresponding to the first class.

The processor 140 may determine the operation of the electronic device 100 based on information about the object. Specifically, if the object recognition model outputting information on the object is identified as a model located at the end node (or leaf node) of the hierarchical structure, the processor 140 may determine the operation to be performed by the electronic device 100 based on the information on the object. If only the object recognition model of the first level (or root node) is loaded into the volatile memory 130, the processor 140 may determine the operation of the electronic device 100 based on information about the object obtained through the first level of object recognition model.

In an embodiment, if the operation mode is determined to be a learning mode, the processor 140 may train the plurality of object recognition models having a hierarchical structure in various ways.

In an embodiment, when the operation mode is a learning mode, if a new object image is obtained through the camera 110, the processor 140 may obtain feature data of the new object using at least one of the plurality of object recognition models. The "new object" may include an object which might not be classified with an accuracy exceeding a threshold value, when the plurality of object recognition models classify the object into a preset class.

The processor 140 may determine an object recognition model corresponding to a new object among the plurality of object recognition models based on the feature data of the new object and the information on the plurality of object recognition models. The processor 140 may obtain a similarity value between the feature data of the new object and the data for the classes included in each of the plurality of object recognition models. The processor 140 may identify the object recognition model corresponding to the data for the class having the highest similarity value as the object recognition model corresponding to the new object.

The processor 140 may train an object recognition model that may be connected as an upper level of the object recognition model corresponding to the new object based on the feature data of the new object. Specifically, the processor 140 may identify an object recognition model that may be connected as an ancestor node of the object recognition model corresponding to a new object through the operation mode data 20. The processor 140 may then train an object recognition model that may be connected as an identified ancestor node. The processor 140 may train only the object recognition model corresponding to the new object and the object recognition model which may be connected as the upper level of the model, rather than training the entire object recognition model, thereby reducing the number of models to be trained.

In an embodiment, if the operation mode is a learning mode, the processor 140 may control the display 160 to display a user interface (UI) representing the plurality of stored object recognition models. When the object recognition model corresponding to the new object is selected through the UI while the new object image is obtained through the camera 110, the processor 140 may input the new object image to the selected object recognition model to obtain the feature data of the new object image. The processor 140 may train the object recognition model selected based on the feature data of the new object and an object recognition model that may be connected as an upper level of the selected object recognition model.

A function related to artificial intelligence operates through the non-volatile memory 120, the volatile memory 130, and the processor 140.

One or a plurality of processors 140 control the input data to be processed according to a predefined operating rule or AI model stored in the non-volatile memory 120 and the volatile memory 130. Here, being made through learning may refer to a predetermined operating rule or AI model set to perform a desired feature is made by applying learning algorithm to various training data. The learning may be implemented in an electronic apparatus in which artificial intelligence is performed or may be accomplished through a separate server and/or system.

The AI model may be composed of a plurality of neural network layers. Each layer has a plurality of weight values, and performs a layer operation through calculation of a previous layer and an operation of a plurality of weights. Examples of neural networks may include, but are not limited to, a convolutional neural network (CNN), a deep neural network (DNN), a recurrent neural network (RNN), a Restricted Boltzmann Machine Task (RBM), a deep belief network (DBN), a bidirectional deep neural network (BRDNN), and deep Q-networks.

The learning algorithm is a method for training a predetermined target device (e.g., a robot) using a plurality of learning data to make a determination or prediction of a predetermined target device by itself. Examples of learning algorithms include supervised learning, unsupervised learning, semi-supervised learning, or reinforcement learning, but the learning algorithm is not limited to the examples described.

Figure 2:
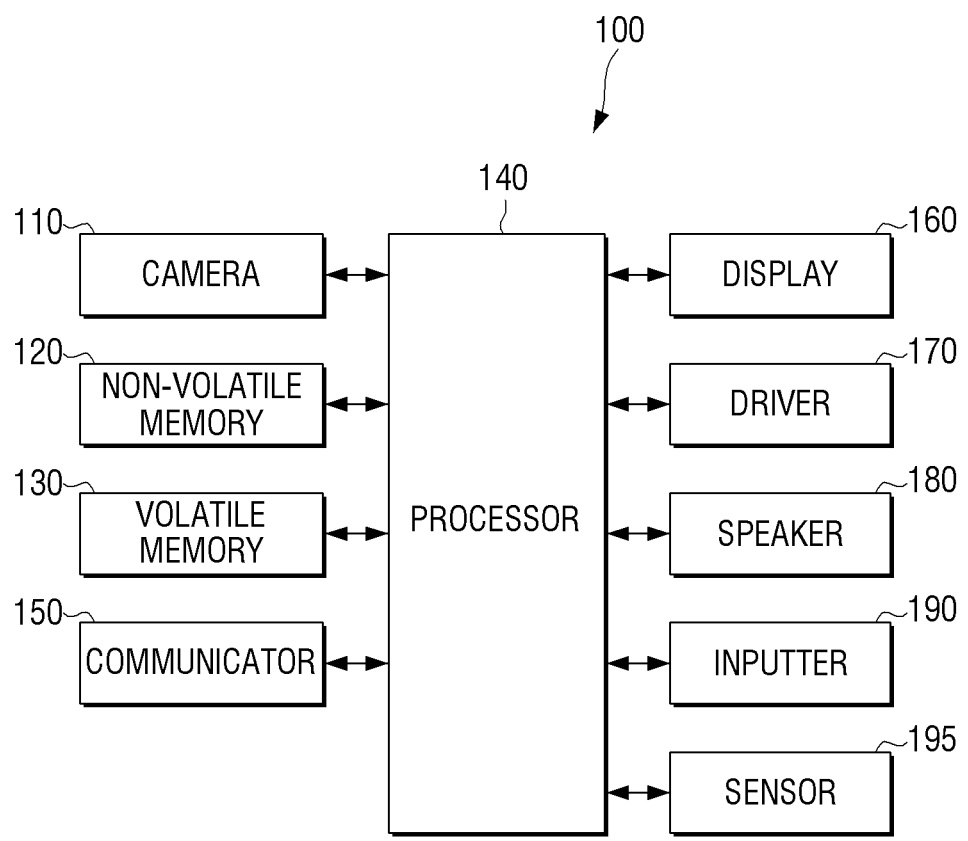
FIG. 2 is a diagram illustrating a configuration of an electronic device in detail according to an embodiment.

FIG. 2 illustrates a configuration of the electronic device 100 in detail, according to an embodiment. As illustrated in FIG. 2, the electronic device 100 may include the camera 110, the non-volatile memory 120, the volatile memory 130, the processor 140, a communicator 150, a display 160, a driver 170, a speaker 180, an inputter 190, and a sensor 195. The camera 110, the non-volatile memory 120, the volatile memory 130, and the processor 140 are described above.

The communicator 150 may include a circuitry, and may communicate with a server or an external device. The processor 140 may receive various data or information from a server or an external device connected through the communicator 150, and may transmit various data or information to a server or an external device.

The communicator 150 may include various communication modules to communicate with the external device. For example, the communicator 150 may include a wireless communication module, for example, a cellular communication module using at least one of long term evolution (LTE), LTE Advance (LTE-A), code division multiple access (CDMA), wideband CDMA (WCDMA), universal mobile telecommunications system (UMTS), wireless broadband (WiBro), $5^{th}$ generation (5G), global system for mobile communications (GSM), or the like. For example, the wireless communication module may include, for example, wireless fidelity (WiFi), Bluetooth, Bluetooth low energy (BLE), ZigBee, or the like.

The display 160 may display various information according to control of the processor 140. In an embodiment, the display 160 may display a UI indicating a plurality of object recognition models according to the control of the processor 140.

The display 160 may be implemented as a liquid crystal display (LCD) device, an organic light emitting diode (OLED) display, or the like, and may be implemented as a flexible display, a transparent display, or the like. The display 160 may be implemented as a touch screen with a touch panel. However, an embodiment is not limited thereto, and the display 160 may be implemented differently depending on the type of the electronic device 100.

The driver 170 is configured to move the electronic device 100 and may include a motor and a plurality of wheels. The driver 170 may move the electronic device 100 according to the control of the processor 140.

The speaker 180 is configured to output various alert sound or voice messages as well as various audio data, which are decoded or amplified by an audio processor, and perform various processing operations such as noise filtering. When the operation of the electronic device 100 is complete, the speaker 180 may output an alert message that the operation has been completed. In an embodiment, if a human face included in the object image is not a pre-registered human through the object recognition model of the third level when the operation mode is the third operation mode, the speaker 180 may output the alert message by the control of the processor 140.

The speaker 180 is merely an example and may be implemented as another output terminal capable of outputting audio data.

The inputter 190 may include a circuitry and the processor 140 may receive user commands to control an operation of the electronic device 100 through the inputter 190. The inputter 190 may include a touch sensor, a (digital) pen sensor, a pressure sensor, a key, and/or a microphone. The touch sensor may use, for example, at least one of an electrostatic type, a pressure sensitive type, an infrared type, and an ultrasonic type.

In an embodiment, if the operation mode is a learning mode, the inputter 190 may receive an input to select an object recognition model corresponding to a new object from the user. The inputter 190 may transmit the received input to the processor 140.

The sensor 195 may sense various status information of the electronic device 100. For example, the sensor 195 may include a sensor (e.g., an ultrasonic sensor, a proximity sensor, an optical sensor, an infrared (IR) sensor, an ultra-wideband (UWB) sensor, light detection and ranging (Li-DAR) sensor, or the like) capable of sensing various physical amount such as presence or distance of a user or an object information of the electronic device 100, a sensor (for example, a temperature sensor, a humidity sensor, an air pressure sensor, and the like) capable of sensing environmental information around the electronic device 100, a sensor that may sense position information (e.g., a global positioning system (GPS) sensor), or the like.

Figure 3A:
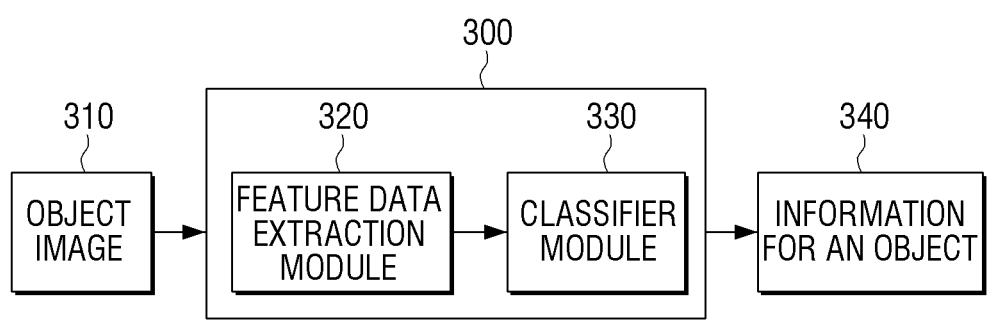
FIG. 3A is a diagram illustrating a configuration and an operation of an object recognition model according to an embodiment.

FIG. 3A is a diagram illustrating a configuration and an operation of an object recognition model 300 stored in the non-volatile memory 120 according to an embodiment. As illustrated in FIG. 3A, the object recognition model 300 may include a feature data extraction module 320 and a classifier module 330. Each of the feature data extraction module 320 and the classifier module 330 may be controlled by the processor 140.

The feature data extraction module 320 may output the feature data of the object input via the object image 310. This is merely an example, and the feature data extraction module 320 may output the feature data for a voice, a text, or the like.

The feature data extraction module 320 may be implemented with convolutional neural network (CNN), but this is merely an example, and may be implemented with various artificial intelligence neural network such as deep neural network (DNN), recurrent neural network (RNN), or the like.

The classifier module 330 may output the information 340 for the object based on the feature data of the object obtained through the feature data extraction module 320. In an embodiment, the information 340 for an object may include information about whether an object is classified into any of a predetermined class, or the like. That is, the classifier module 330 may output information on which class the object belongs when the feature data of the object is classified according to a predetermined condition. In an embodiment, the classifier module 330 included in the object recognition model that identifies whether the object is subject to avoidance (hereinafter, avoidance target) may output information about the result of classifying the object as an avoidance target or a non-avoidance target based on the obtained feature data of the object.

Figure 3B:
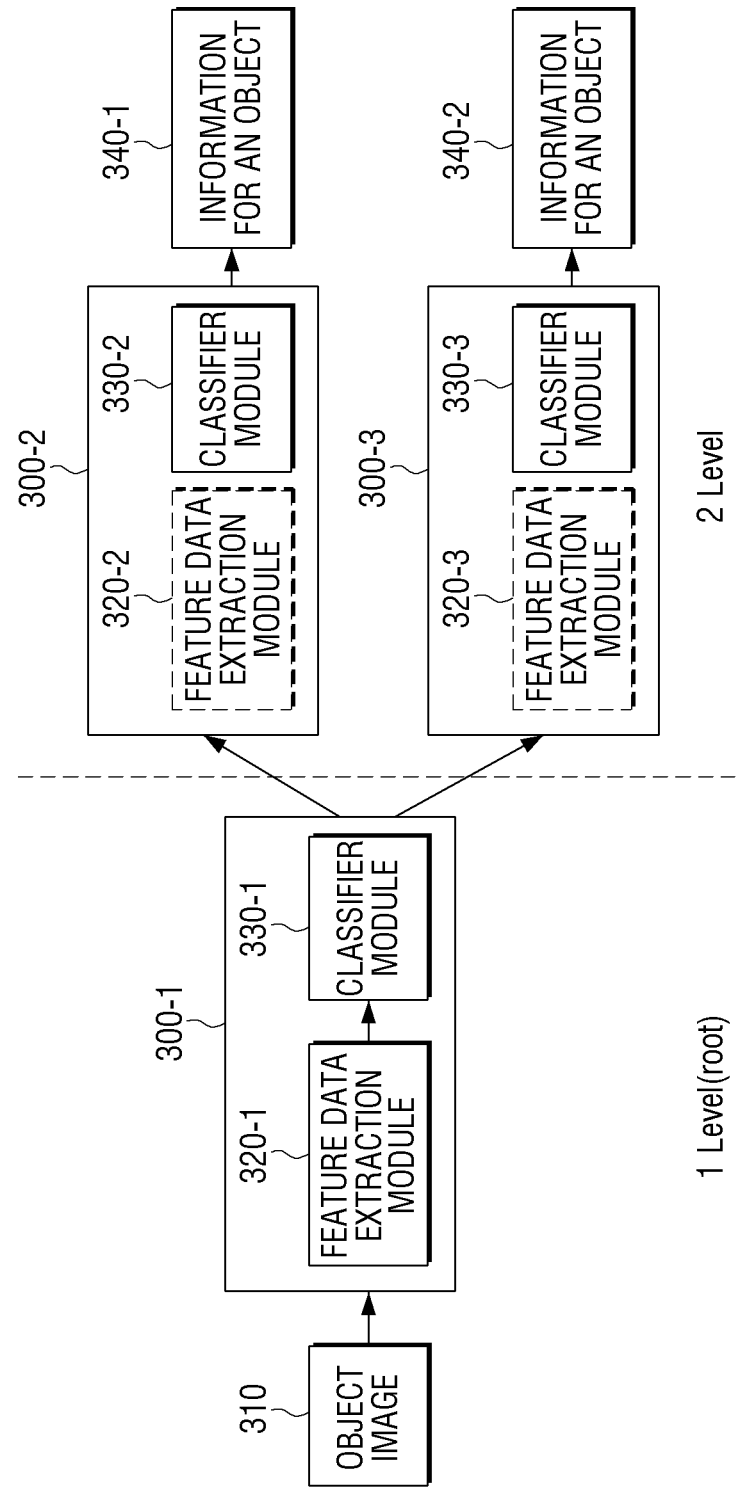
FIG. 3B is a diagram illustrating a configuration and an operation of an object recognition model having a hierarchical structure according to an embodiment.

The classifier module 330 may include data for a class. The data for a class is a collection of data that may classify an object into a plurality of classes according to a predetermined condition. The classifier module 330 included in each object recognition model has a different predetermined condition and thus, data for a class may be different, but this is merely an example, and data for a duplicated class may be included. In an embodiment, a classifier module included in an object recognition model that identifies whether an object is an avoidance target may include data that may classify an object into one class of an avoidance target or a non-avoidance target. FIG. 3B is a diagram illustrating the construction and operation of the object recognition model having a hierarchical structure, according to an embodiment.

In an embodiment, as shown in FIG. 3B, when a first level object recognition model 300-1 and second level object recognition models 300-2 and 300-3 are layered and loaded into the volatile memory 130 by the electronic device 100, the first level object recognition model 300-1 may output information on the object based on the input object image 310. Specifically, the object recognition model 300-1 of the first level may extract feature data of the object through the object image, and may output information on the object which is the result of classifying the extracted feature data of the object according to a predetermined condition.

The electronic device 100 may identify a model corresponding to obtained information on the object among the second level object recognition models 300-2, 300-3. The electronic device 100 may identify a model corresponding to the obtained information on the object as a model to which the feature data of the object obtained through the first level object recognition model is input.

For example, when the first level object recognition model 300-1 is a model that identifies whether the object is an avoidance target, and outputs information that the object is classified as an avoidance target, the electronic device 100 may identify an object recognition model capable of classifying the avoidance target, among the second level object recognition models 300-2 and 300-3, into a preset class. The electronic device 100 may identify an object recognition model which may classify the avoidance target into a preset class as a model for inputting feature data of the object obtained through the object recognition model 300-1 of the first level. The electronic device 100 may input feature data of the object to an object recognition model corresponding to the class classified by the object among the second level object recognition models 300-2 and 300-3 of the second level.

In the example of an object recognition model having a hierarchical structure including at least two levels, the electronic device 100 may activate only the feature data extraction module included in the model of the top level, and may deactivate the feature data extraction module included in the model of the remaining lower level. An operation to deactivate the module may include controlling the module to not perform a particular operation. For example, referring to FIG. 3B, the electronic device 100 may include the feature data extraction module 320-1 and the classifier module 330-1. The electronic device 100 may activate the feature data extraction module 320-1 included in the first level object recognition model 300-1 and may deactivate the feature data extraction modules 320-2, 320-3 included in the second level object recognition models 300-2, 300-3 which are models of a lower level.

Accordingly, the classifier modules 330-2 and 330-3 included in the model in which the feature data of the object among the second level object recognition models 300-2 and 300-3 of the second level are input may output information 340-1 and 340-2 for the object using the feature data of the object. The second level object recognition models 300-2 and 300-3 of the second level may extract information about the object by utilizing the feature data of the object output from the object recognition model of the first level, and the feature data extraction modules 320-2 and 320-3 included in each model may be deactivated so as not to perform extracting the feature data of the object.

In an embodiment, when information about an object is output in an object recognition model located at the end node, the electronic device 100 may determine an action based on information about the object. In an embodiment, as shown in FIG. 3B, if the second level object recognition model which outputs information 340-1 and 340-2 for the object is a model located at the end node of the hierarchical structure, the electronic device 100 may determine an action based on information about the object.

Figure 4:
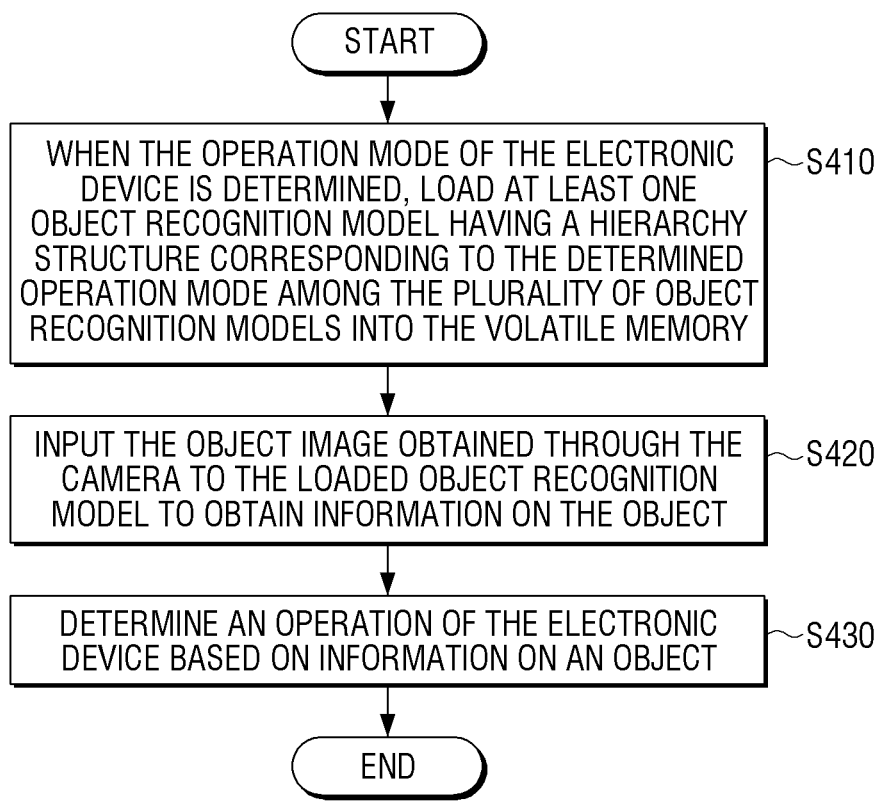
FIG. 4 is a flowchart illustrating a method of controlling an electronic device according to an embodiment.

FIG. 4 is a flowchart illustrating a method of controlling the electronic device 100 according to an embodiment.

When the operation mode of the electronic device 100 is determined, the electronic device 100 may load at least one object recognition model having a hierarchical structure corresponding to the determined operation mode among the plurality of object recognition models into the volatile memory 130 in operation S410. Specifically, the electronic device 100 may configure an object recognition model having a hierarchical structure corresponding to an operation mode in various ways using a plurality of object recognition models and operation mode data stored in the non-volatile memory 120, and load the configured object recognition model into the volatile memory 130.

In an embodiment, the electronic device 100 may identify information about the number of levels of the hierarchical structure corresponding to the operation mode through the operation mode data stored in the non-volatile memory 120, the type of object recognition model that may be placed at each level of the hierarchical structure and the association relationship between the object recognition models. The electronic device 100 may construct an object recognition model having a hierarchical structure corresponding to an operation mode through the identified respective information and load the same into the volatile memory 130. Since the above is described in detail above with reference to Table 1 and FIG. 1E, repeated descriptions will be omitted.

In an embodiment, the electronic device 100 may identify a plurality of hierarchical structure templates of the operating mode data, an index number capable of identifying each hierarchical structure template, and configuration information of a hierarchical structure corresponding to the operating mode. The electronic device 100 may construct an object recognition model having a hierarchical structure corresponding to an operation mode through the identified respective information and load the same into the volatile memory 130. Since the above method is described in detail above with reference to FIG. 1B, a repeated description will be omitted.

In an embodiment, the electronic device 100 may identify a number of levels corresponding to the operation mode via operation mode data. The electronic device 100 may load the layered object recognition model into the volatile memory 130 from a first level (root level) among a plurality of object recognition models having a fixed hierarchy stored in the non-volatile memory 120 to the identified number of levels. Since the above is described in detail with reference to FIG. 1E, a repeated description will be omitted.

The electronic device 100 may input the object image obtained through the camera 110 to the loaded object recognition model to obtain information on the object in operation S420. Specifically, the electronic device 100 may input the obtained object image to a top level object recognition model to obtain feature data of the object. The electronic device 100 may obtain information on the object based on the feature data of the object. If the object recognition model outputting information on the object is not a model corresponding to the end node on the hierarchical structure, the electronic device 100 may identify the object recognition model to which the feature data of the object is input, among the object recognition models of the lower level, based on the information on the object.

The electronic device 100 may determine an operation based on information on an object in operation S430. If the object recognition model outputting information on the object is a model corresponding to the upper node on the hierarchical structure, the electronic device 100 may determine an operation based on the information on the object.

FIGS. 5 to 10 are diagrams illustrating the structure and operation of an object recognition model having a hierarchical structure loaded into a volatile memory 130 according to each mode of operation, according to an embodiment. The process of loading a plurality of object recognition models stored in the non-volatile memory 120 into the volatile memory 130 is described in detail above, and thus a repeated detailed description will be omitted.

Figure 5:
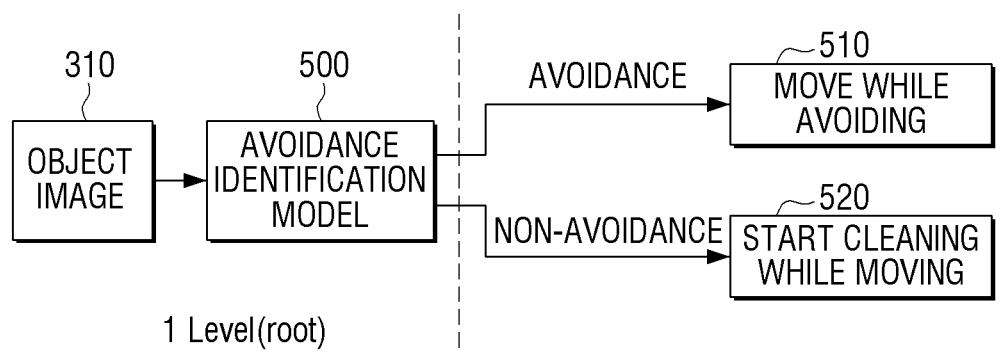
FIG. 5 is a diagram illustrating an operation of an electronic device when an operation mode of the electronic device is a first operation mode according to an embodiment.
Figure 6:
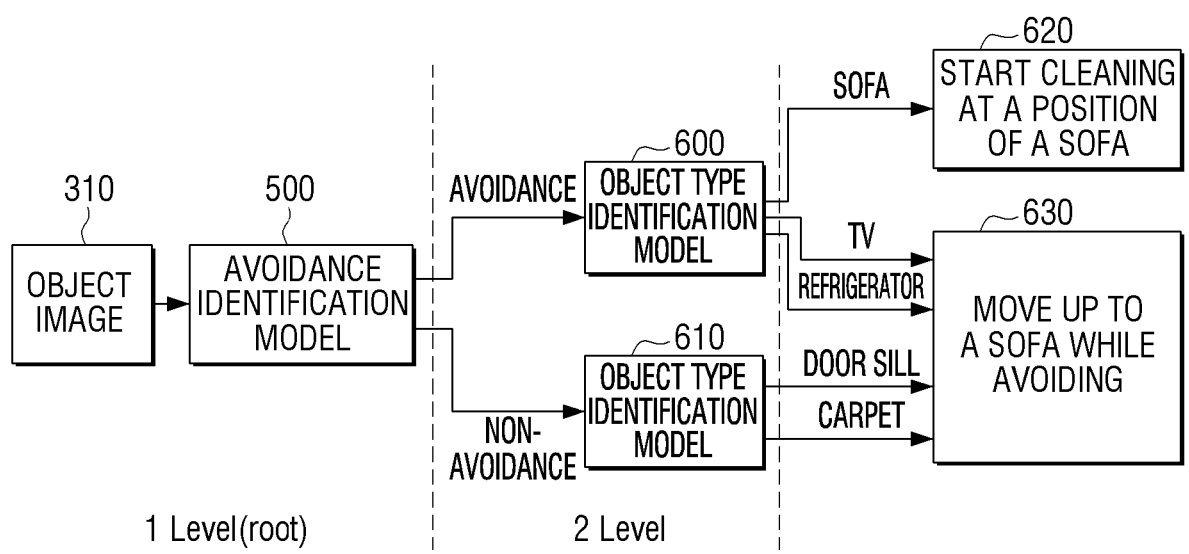
FIG. 6 is a diagram illustrating an operation of an electronic device when an operation mode of the electronic device is a second operation mode according to an embodiment.
Figure 7:
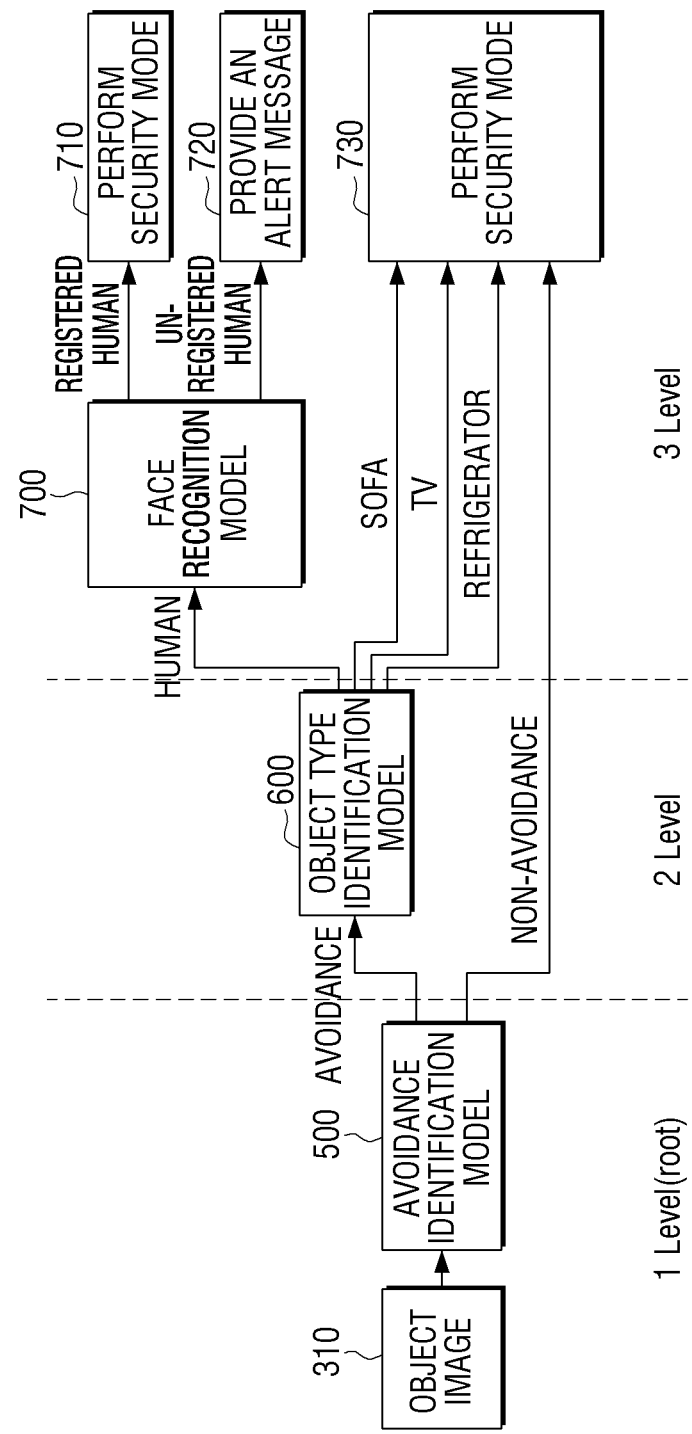
FIG. 7 is a diagram illustrating an operation of an electronic device when an operation mode of an electronic device is a third operation mode according to an embodiment.
Figure 8:
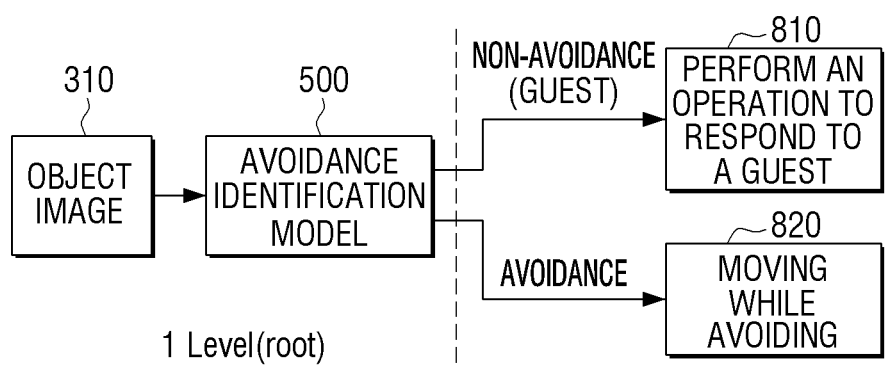
FIG. 8 is a diagram illustrating an operation of an electronic device when an operation mode of an electronic device is a first operation mode according to an embodiment.
Figure 9:
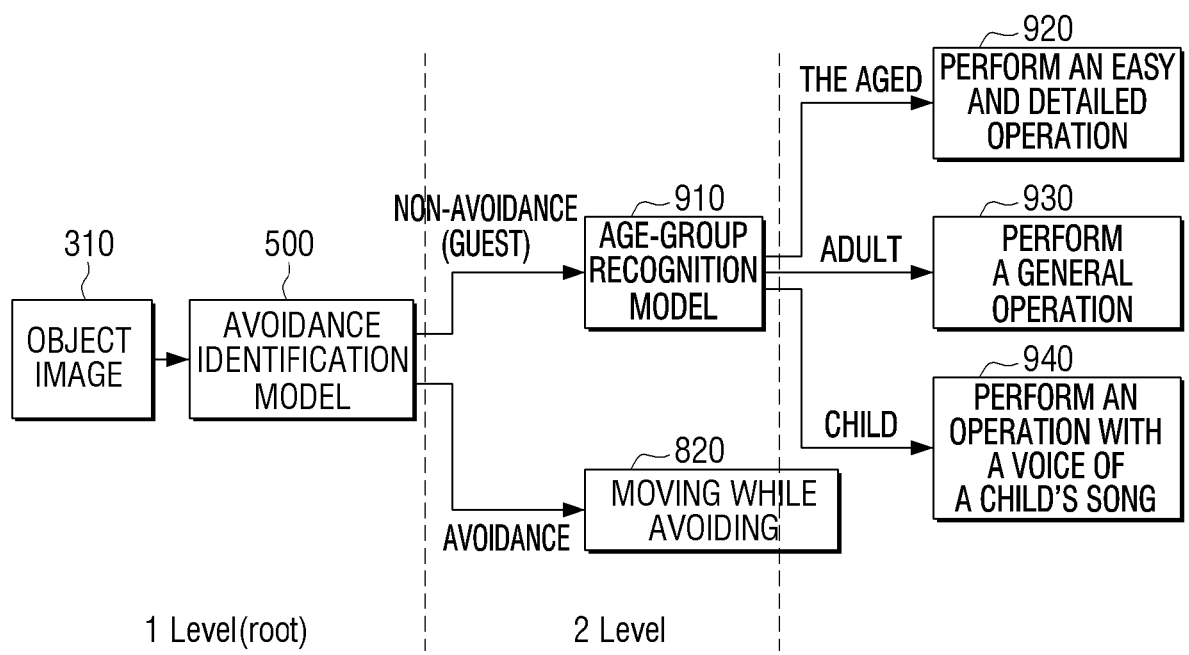
FIG. 9 is a diagram illustrating an operation of an electronic device when an operation mode of the electronic device is a second operation mode according to an embodiment.
Figure 10:
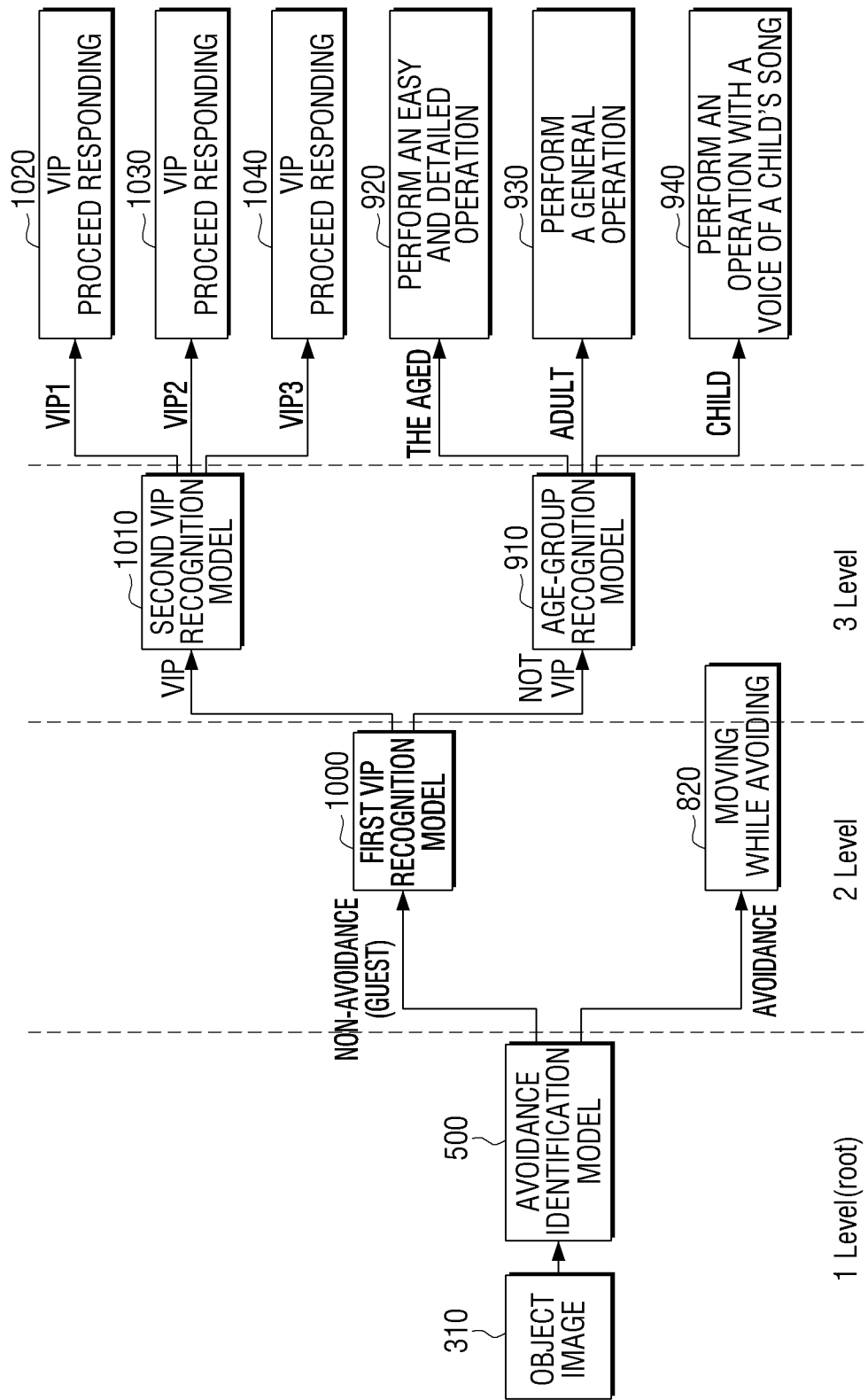
FIG. 10 is a diagram illustrating an operation of an electronic device when an operation mode of the electronic device is a third operation mode according to an embodiment.

FIGS. 5 to 7 are embodiments when the electronic device 100 is implemented as a cleaning robot, and FIGS. 8 to 10 are embodiments when the electronic device 100 is implemented as a retail robot.

The electronic device 100 according to an embodiment may include at least one of a smartphone, a tablet personal computer (PC), desktop PC, a laptop PC, a netbook computer, a server, a personal digital assistant (PDA), a medical device, or a wearable device. In some embodiments, the electronic device 100 may include at least one of a television, a refrigerator, an air-conditioner, an air purifier, a set-top box, robots, a media box (example: Samsung HomeSync™, Apple TV™, or Google TV™), or the like, but is not limited thereto.

A plurality of operation modes may be implemented in a various manner according to a type of the electronic device 100, and object recognition models corresponding to each operation mode may be implemented in a various manner. The plurality of object recognition models having a hierarchical structure are not limited to FIGS. 5 to 10.

FIG. 5 is a diagram illustrating the object recognition model loaded to the volatile memory 130 when the electronic device 100 according to an embodiment is implemented with a cleaning robot, and the operation mode is determined to be the first operation mode.

If the operation mode is determined to be the normal cleaning mode which is the first operation mode, the electronic device 100 may load an avoidance identification model 500, i.e., the first level object recognition model, that identifies whether the object is an avoidance target into the volatile memory 130. The electronic device 100 may input the object image 310 obtained through the camera 110 into the avoidance identification model 500. The avoidance identification model 500 may output feature data of the object based on the input object image. The avoidance identification model 500 may output the result information of classifying an object to an avoidance target or non-avoidance target based on the feature data of the object. Accordingly, the electronic device 100 may identify whether an object existing in the periphery of the electronic device 100 is an avoidance target through the result information output from the avoidance identification model 500.

If the operation mode is a common cleaning mode, the object recognition model loaded in the volatile memory 130 is the avoidance identification model 500 that is the first level object recognition model, and the electronic device 100 may determine an operation based on the result information obtained from the avoidance identification model 500. If information that the object is an avoidance target is included in the result information, the electronic device 100 may move while avoiding the object (operation 510). If the information that the object is non-avoidance target is included in the result information, the electronic device 100 may start cleaning while moving in the periphery of the object without avoiding the object (operation 520).

FIG. 6 is a diagram illustrating the object recognition model loaded into the volatile memory 130 when the electronic device 100 is implemented with a cleaning robot and the operation mode is determined to be the second operation mode, according to an embodiment.

If the operation mode is determined to be a specific location cleaning mode which is the second operation mode, the electronic device 100 may load the avoidance identification model 500 for identifying whether the object is an avoidance target as the first level object recognition model, and may load, to the volatile memory 130, second level object recognition models 600, 610, i.e., object type identification models, capable of identifying a type of an object with the second level object recognition model that is a lower level of the first level. In an embodiment, as shown in FIG. 1B, if the second operation mode is determined, the electronic device 100 may identify that the hierarchical template corresponding to the second operation mode is the first template through the configuration information of the hierarchical structure of the operation mode data. In addition, the electronic device 100 may identify that the avoidance identification model 500 may be linked to the first level based on the first template, through the configuration information of the hierarchical structure, and that a second level object recognition model 600 identifying the type of the avoidance target and a second level object recognition model 610 identifying the type non-avoidance target may be linked to the second level. Accordingly, the electronic device 100 may load the object recognition model having the hierarchical structure into the volatile memory 130 as shown in FIG. 6 based on the identified information. The avoidance identification model 500 is described with reference to FIG. 5, and, thus, a repeated description will be omitted.

The electronic device 100 may identify the object recognition model to which the feature data of the object obtained through the avoidance identification model 500, among the plurality of second level object recognition models 600 and 610, is input based on the result information output from the avoidance identification model 500. In an embodiment, upon obtaining information that the object is classified as a class of avoidance target, the electronic device 100 may identify the second level object recognition model 600 that identifies the type of avoidance target corresponding to the classified class among the second level object recognition models 600, 610 as a model to which the feature data of the object is to be input. For example, upon obtaining information that the object is classified as a class of non-avoidance target, the electronic device 100 may identify the second level object recognition model 610 that identifies the type of non-avoidance target corresponding to the classified class of the second level object recognition models 600, 610 as a model to which the feature data of the object is to be input.

As an embodiment, each of the second level object recognition models 600, 610 may output result information that classifies a type of an object based on the feature data of the input object. The electronic device 100 may identify a type of an object through each of the second level object recognition models 600, 610.

While the mode of operation is determined to be a specific positioning mode, the electronic device 100 may obtain information about a specific location from the user. In an embodiment, the electronic device 100 may receive user voice (e.g., "clean around the sofa") including information about a particular location from the user. In an embodiment, the electronic device 100 may display a UI for selecting a specific location and receive, from the user, a signal for selecting a specific location through the displayed UI.

In an embodiment, when the identified object corresponds to a specific location cleaning mode, the electronic device 100 may perform an operation corresponding to a specific location cleaning mode. That is, if the identified object corresponds to an object that is requested to be cleaned from the user, the electronic device 100 may begin cleaning around the identified object. For example, if the operation mode is determined to be a specific location cleaning mode and a command to clean the sofa is input from the user, the electronic device 100 may begin to clean at the sofa location (operation 620). For example, if the object is identified as an object other than a sofa, the electronic device 100 may move until identifying the object which is the sofa while avoiding the object (operation 630).

FIG. 7 is a diagram illustrating an object recognition model loaded to the volatile memory 130 when the electronic device 100 is implemented with a cleaning robot, and the operation mode is determined to be the third operation mode.

In an embodiment, if the operation mode is determined to be a security mode which is the third operation mode, the electronic device 100 may load, to the volatile memory, the avoidance identification model 500 for identifying whether an object, which is an object recognition model of a first level, is an avoidance target, a second level object recognition model 600 capable of identifying a type of an object as a second level object recognition model at a second level which is a lower than a first level, and a face recognition model 700 for recognizing a human face as an object recognition model of a third level which is a lower level of a second level. The avoidance identification model 500 and the second level object recognition model 600 are described above and the description will not be repeated.

If the operation mode is determined to be a security mode, the electronic device 100 might not load the second level object recognition model 610 identifying the type of non-avoidance target which is the second level of object recognition model into the volatile memory 130. The security mode may be a mode for identifying whether the object is a registered human through the face recognition model 700, which is a third level object recognition model. When the type of the object is the non-avoidance target which is not a human, a type of the object is not identified if the operation mode is a security mode, the electronic device 100 might not load, to the volatile memory 130, the second level object recognition model 610 for identifying the type of the non-avoidance target as an object recognition model of the second level on the hierarchical structure.

As an embodiment, as illustrated in FIG. 7, if the type of the object is identified as a human through the second level object recognition model 600 identifying the type of the avoidance target, the electronic device 100 may input the feature data of the object obtained from the avoidance identification model 500 to the face recognition model 700, which is the object recognition model of the third level.

According to an embodiment, the face recognition model 700 may output the result information of classifying the human face included in the object image into a registered human face or an unregistered human face based on feature data of the object. Accordingly, the electronic device 100 may identify whether the human face included in the object image is a pre-registered human face through the face recognition model 700.

In an embodiment, if it is identified that the human face included in the object image is not a pre-registered human face, the electronic device 100 may provide an alert message (operation 720). For example, the electronic device 100 may transmit, to a preset human or organization (e.g., a pre-registered human, a security company, a police, etc.), a message that the unregistered human face is identified. For example, the electronic device 100 may output an alert that an unregistered human is identified.

In an embodiment, if it is identified that the human face included in the object image is a pre-registered human face, the electronic device 100 may perform a security mode while moving avoiding the identified human face (operation 710).

In addition, as illustrated in FIG. 7, if the object is identified as a non-avoidance target through the avoidance identification model 500, or the second level object recognition model 600 identifies the type of avoidance target which is not a human, the electronic device 100 may perform a security mode while moving avoiding the identified object (operation 730).

FIG. 8 is a diagram illustrating an object recognition model loaded to the volatile memory 130 when the electronic device 100 is implemented as a retail robot, and the operation mode is determined to be the first operation mode, according to an embodiment.

If the operation mode is determined to be a busy mode which is the first operation mode, the electronic device 100 may load, to the volatile memory 130, the avoidance identification model 500 identifying whether the object is an avoidance target with the object recognition model of the first level.

In an embodiment, the electronic device 100 may identify whether the object is a non-avoidance target or an avoidance target through the avoidance identification model 500. Specifically, the electronic device 100 may input an object image 310 for the object into the avoidance identification model 500. The avoidance identification model 500 may output feature data of the object based on the object image 310 for the object. The avoidance identification model 500 may output the result information classifying the object as a guest who is a non-avoidance target or an avoidance target based on the feature data of the object. In an embodiment, if it is identified that the object is not a human, the avoidance identification model 500 may output the result information classifying the object as the avoidance target. In an embodiment, if the object is identified as a registered human, such as a store employee, the avoidance identification model 500 may output the result information classifying the object as the avoidance target. Accordingly, the electronic device 100 may identify whether the object is a non-avoidance target such as a guest or an avoidance target based on the result information output from the avoidance identification model 500.

If the operation mode is a busy mode, the object recognition model loaded in the volatile memory 130 is the avoidance identification model 500 which is the first level object recognition model and the electronic device 100 may determine an operation to be performed based on the result information obtained from the avoidance identification model 500. If the result information includes information that the object is a guest who is a non-avoidance target, the electronic device 100 may perform a guest response operation (e.g., displaying a UI that provides store location information, price information of the article, etc.) (operation 810). If information that the object is an avoidance target is included in the result information, the electronic device 100 may move while avoiding the object (operation 820).

FIG. 9 is a diagram illustrating an object recognition model loaded to the volatile memory 130 when the electronic device 100 is implemented as a retail robot, and the operation mode is determined to be the second operation mode.

When the operation mode is determined to be the normal mode which is the second operation mode, the electronic device 100 may load the avoidance identification model 500 for identifying whether the object is an avoidance target, and may load the model capable of identifying the type of the non-avoidance target as the object recognition model of the second level, which is the lower level of the first level, in the volatile memory 130. The model capable of identifying the type of a non-avoidance target may be implemented with an age-group recognition model 910, i.e., as a second level object recognition model, which may recognize the age group of a guest, but this is not limiting, and may be variously implemented as a height recognition model of a guest, a personal belongings recognition model of a guest, and the like. Since the avoidance identification model 500 is described above, a repeated description will be omitted.

As illustrated in FIG. 9, the second level object recognition model is one age-group recognition model 910 and thus, if the object is identified as a guest who is subject to avoidance, the electronic device 100 may input the feature data of the object obtained through the avoidance identification model 500 to the age-group recognition model 910.

The electronic device 100 may recognize the age-group of a guest who is an object through the age-group recognition model 910. In an embodiment, as illustrated in FIG. 9, the age-group recognition model 910 may output result information classifying the age-group of guests to the aged, adult, children, or the like, based on the input feature data of the object. The electronic device 100 may recognize the age-group of the guest based on result information obtained through the age-group recognition model 910.

In the second operation mode, the age-group recognition model 910, which is the object recognition model of the second level, is a model corresponding to the end node on the hierarchical structure, so that the electronic device 100 may determine an operation based on the result information obtained through the age-group recognition model 910. In an embodiment, if the age-group of the guest is identified as the aged, the electronic device 100 may perform an easy and detailed guest response operation (operation 920). For example, if the age-group of the guest is identified as an adult, the electronic device 100 may perform a predetermined common guest response operation (operation 930). For example, if the age-group of a guest is identified as a child, the electronic device 100 may perform a guest response operation with a voice of a children's song (operation 940). If the object is identified as an avoidance target through the avoidance identification model 500, the electronic device 100 may move while avoiding the object (operation 820).

FIG. 10 is a diagram illustrating an object recognition model loaded to the volatile memory 130 when the electronic device 100 is implemented as a retail robot, and the operation mode is determined to be the third operation mode.

In an embodiment, as illustrated in FIG. 10, if the operation mode is determined to be the very important person (VIP) mode which is the third operation mode, the electronic device 100 may load, to the volatile memory 130, the avoidance identification model 500 for identifying whether the object is avoidance target as the first level object recognition model, the first VIP recognition model 1000 for identifying whether the guest is a pre-registered VIP guest as the second object recognition model which is a lower level of the first level, the second VIP recognition model 1010 and the age-group recognition model 910 for identifying individual VIP guests as the third level object recognition models which are a lower level of the second level.

As illustrated in FIG. 10, the second level object recognition model is one first VIP recognition model 1000 and thus, if the object is identified as a guest that is an avoidance target, the electronic device 100 may input the feature data of the object obtained through the avoidance identification model 500 to the first VIP recognition model 1000.

The electronic device 100 may identify whether the guest is a pre-registered VIP guest through the first VIP recognition model 1000. In an embodiment, the first VIP recognition model 1000 may output result information classifying the guest who is an object as a VIP guest or a common guest, not the VIP, based on the input feature data of the object. Therefore, the electronic device 100 may identify whether the guest is a pre-registered VIP guest based on the result information obtained through the first VIP recognition model 1000.

In an embodiment, the electronic device 100 may identify an object recognition model among the third level object recognition models, e.g., the second VIP recognition model 1010 and the age-group recognition model 910, to which the feature data of the object obtained through the first VIP recognition model 1000 is to be input based on whether the guest is a pre-registered VIP guest. In an embodiment, when the first VIP recognition model 1000 obtains information that the guest is classified as a class of pre-registered VIP guest, the electronic device 100 may identify the feature data of the object using the second VIP recognition model 1010 as the third level object recognition model. For example, if information that the guest who is the object is classified as a class of a common guest, not the pre-registered VIP guest, through the first VIP recognition model 1000, the electronic device 100 may identify the feature data of the object using the age-group recognition model 910 as the third level object recognition.

In an embodiment, if the guest is identified as the VIP, the electronic device 100 may identify individual VIP guests by inputting specific data to the second VIP recognition model 1010. The second VIP recognition model 1010 may output result information regarding classification of guests based on the input feature data of the object. The electronic device 100 may identify who is the guest included in the object image, among the pre-registered VIP guests, based on the result information obtained from the second VIP recognition model 1010.

The second VIP recognition model 1010 is a model corresponding to the end node among the hierarchical structure and thus, the electronic device 100 may determine an operation based on result information obtained through the second VIP recognition model 1010. In an embodiment, the electronic device 100 may perform a response operation corresponding to the identified pre-registered VIP guest (e.g., operations 1020, 1030, 1040). For example, if the object is identified as the first VIP guest, the electronic device 100 may perform an operation, for example, the operation displaying information on a recently-purchased product corresponding to the first VIP guest (operation 1020).

In an embodiment, if the guest who is the object is identified as a common guest, other than the VIP guest, the electronic device 100 may recognize the age-group of the guest by inputting the feature data of the object to the age-group recognition model 910 and perform an operation corresponding to the recognized age-group. An operation using the age-group recognition model 910 is described above with reference to FIG. 9.

Figure 11:
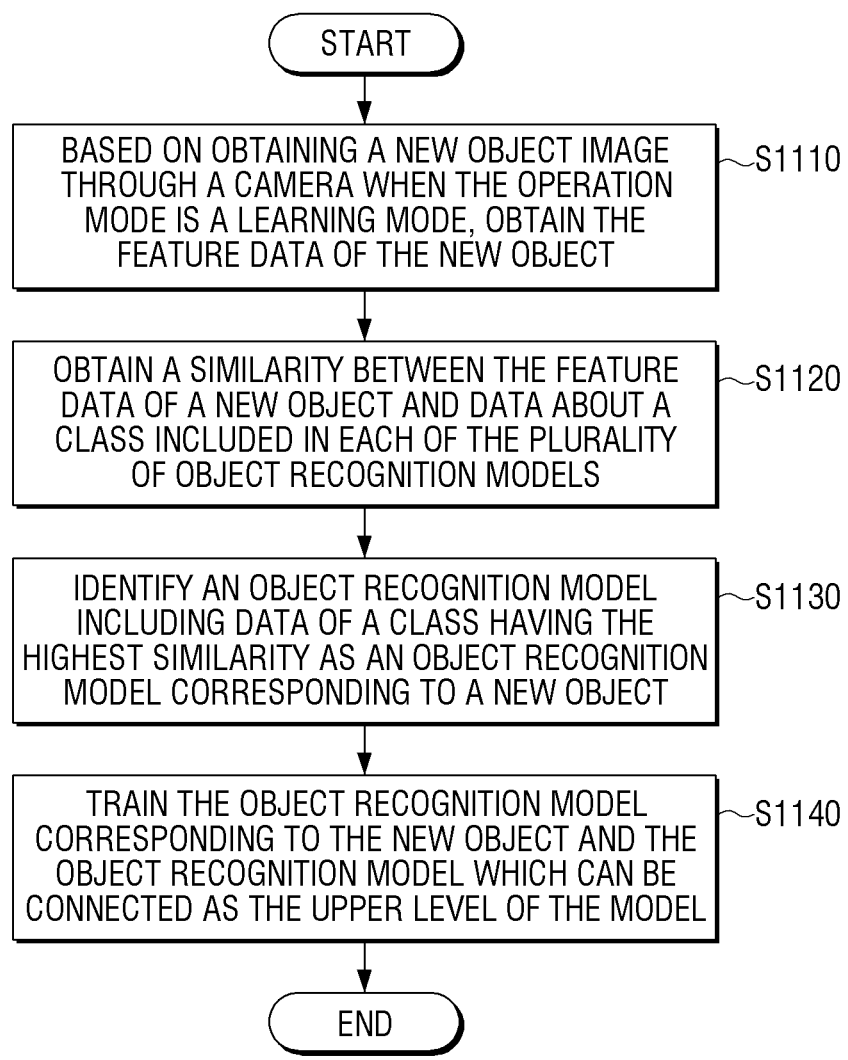
FIG. 11 is a flowchart illustrating a learning method of an electronic device according to an embodiment.

FIG. 11 is a flowchart illustrating an embodiment in which the electronic device 100 additionally trains the object recognition model based on the class data which each of the object recognition model may classify, when an image of the object is input, according to an embodiment.

Based on obtaining a new object image through a camera when the operation mode is a learning mode, the electronic device 100 may obtain the feature data of the new object in operation S1110. The electronic device 100 may obtain feature data of a new object using one of a plurality of object recognition models.

The electronic device 100 may determine an object recognition model corresponding to a new object among the plurality of object recognition models based on the feature data of the new object and information on the plurality of object recognition models. The electronic device 100 may obtain a similarity between the feature data of a new object and data about a class included in each of the plurality of object recognition models stored in the non-volatile memory 120 in operation S1120. The electronic device 100 may identify and determine an object recognition model including data of a class having the highest similarity, among a plurality of object recognition models, as an object recognition model corresponding to a new object in operation S1130.

The electronic device 100 may train the object recognition model corresponding to the new object and the object recognition model which may be connected as the upper level of the model based on the feature data of the new object in operation S1140. The electronic device 100 may train the determined object recognition model to increase the number of classes that may classify the object. Specifically, the electronic device 100 may identify an object recognition model that may be connected as an upper level of an object recognition model corresponding to a new object through operation mode data stored in the non-volatile memory 120. The electronic device 100 may train only an object recognition model corresponding to a new object and an object recognition model which may be connected as an upper level of the model rather than training an entire object recognition model.

In an embodiment, the electronic device 100 may train an object recognition model connectable as an upper level or a lower level of the object recognition model corresponding to a new object simultaneously or within a threshold time, based on the feature data of a new object. For example, if the object recognition model corresponding to the new object is not a model to be disposed in a leaf node on the hierarchical structure, the electronic device 100 may identify the object recognition model connectable as an upper level or a lower level that is connectable to the object recognition model corresponding to the new object through the operation mode data, and train the identified object recognition based on the feature data of the object.

FIG. 12 is a flowchart illustrating a process of training an object recognition model selected by a user based on the specific data of a new object by the electronic device 100 according to an embodiment.

If the operation mode is the learning mode, the electronic device 100 may display a UI indicating a plurality of object recognition models stored in the volatile memory 130 in operation S1210. In the UI indicating a plurality of object recognition models, each object recognition model may be implemented as an icon or a text, but is not limited thereto. In an embodiment, the electronic device 100 may display a UI indicating a plurality of individual recognition models, but this is merely an example, and the electronic device 100 may display a UI indicating a plurality of fixed object recognition models.

When the object recognition model corresponding to the new object among the plurality of object recognition models is selected from the user through the UI while the new object image is obtained through the camera, the electronic device 100 may input a new object image to the selected object recognition model to obtain the feature data of the new object in operation S1220. If the name of the class corresponding to the new object is input from the user, the electronic device 100 may identify the obtained feature data as data for the class corresponding to the new object for which the name is input in operation S1230. For example, if a model identifying a type of the avoidance target is selected from a user, and a name of a class corresponding to the new object is input as an "air purifier," the electronic device 100 may obtain data corresponding to the new object through the selected model and identify the obtained data as data for a class named "air purifier."

The electronic device 100 may train the selected object recognition model and an object recognition model connectable as the upper level of the selected object recognition model in operation S1240. The electronic device 100 may identify the object recognition model connectable as the upper level of the object recognition model selected through the operation mode data, and train the selected object recognition model and the identified object recognition model based on the data about a class corresponding to a new object.

In an embodiment, if the selected object recognition model is not a model to be placed at the end node, the electronic device 100 may identify an object recognition model that may be connected as a higher level and a lower level of the selected object recognition model via the operation mode data. The electronic device 100 may train an object recognition model which may be connected as an upper level or a lower level of the selected object recognition model or the model, based on the data for a class corresponding to a new object.

According to various embodiments as described above, the electronic device may load, to a volatile memory, only a layered object recognition model corresponding to the determined operation mode, and obtain information on the object through the loaded object recognition model, thereby reducing a computation amount and memory consumption amount of the entire model.

The electronic device according to an embodiment may train only a model related to an object recognition model corresponding to a new object, to train the new object, and therefore, a user may train and utilize the object recognition technology to which an artificial intelligence model is applied more rapidly and efficiently.

As used herein, the expressions "have," "may have," "including," or "may include" may be used to denote the presence of a feature (e.g., a numerical value, a function, an operation, an element of a part), and does not exclude the presence of additional features.

As used herein, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

As used herein, the terms such as "$1^{st}$" or "first" and "$2^{nd}$" or "second" may modify corresponding components regardless of importance or order and are used to distinguish one component from another without limiting the components.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g. a third element) between the other elements.

Herein, the expression "configured to" may be used interchangeably with, for example, "suitable for", "having the capacity to", "designed to", "adapted to", "made to", or "capable of". The expression "configured to" does not necessarily mean "specifically designed to" in a hardware sense. Instead, under some circumstances, "a device configured to" may indicate that such a device may perform an operation along with another device or part. For example, the expression "a processor configured to perform A, B, and C" may indicate an exclusive processor (e.g., an embedded processor) to perform the corresponding operation, or a generic-purpose processor (e.g., a CPU or an AP) that may perform the corresponding operations by executing one or more software programs stored in the memory device.

An electronic device in accordance with various embodiments may include at least one of, for example, smartphones, tablet PCs, desktop PCs, laptop PCs, netbook computers, workstations, servers, a PDA, or a wearable device. In some embodiments, the electronic device may include, for example, a TV, a refrigerator, an air-conditioner, an air purifier, a set-top box, a media box (example: Samsung HomeSync™, Apple TV™, or Google TV™).

As used herein, the term user may refer to a person who uses an electronic device or an apparatus (example: artificial intelligence electronic apparatus) which uses an electronic device.

Embodiments may be implemented as software containing one or more instructions that are stored in machine-readable (e.g., computer-readable) storage medium (e.g., internal memory or external memory). A processor may call instructions from a storage medium and is operable in accordance with the called instructions, including an electronic apparatus (e.g., the electronic device 100). When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium. For example, "non-transitory storage medium" may include a buffer in which data is temporarily stored.

According to embodiments, a method may be provided as the software of a computer program product. A computer program product may be traded between a seller and a purchaser as a commodity. A computer program product may be distributed in the form of a machine readable storage medium (e.g., compact disc ROM (CD-ROM)) or distributed online through an application store (e.g., Play Store™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

Each of the components (for example, a module or a program) according to embodiments may be composed of one or a plurality of objects, and some subcomponents of the subcomponents described above may be omitted, or other subcomponents may be further included in embodiments. Alternatively or additionally, some components (e.g., modules or programs) may be integrated into one entity to perform the same or similar functions performed by each respective component prior to integration. Operations performed by a module, program, or other component, in accordance with embodiments, may be performed sequentially, in a parallel, repetitive, or heuristic manner, or at least some operations may be performed in a different order, omitted, or other operations may be added.

While embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic device configured to operate in a plurality of operation modes, the electronic device comprising:
    a camera;
    a non-volatile memory which stores at least one instruction, a plurality of object recognition models configurable into a hierarchical object recognition model having a hierarchical structure in which the plurality of object recognition models are hierarchically arranged in a plurality of levels, and hierarchical structure information in which each of the plurality of operation modes is associated with a number of levels among the plurality of levels and with one or more object recognition models among the plurality of object recognition models to be disposed at each of the plurality of levels, wherein the number of levels is 2 or more;
    a volatile memory; and
    at least one processor, connected to the non-volatile memory, the volatile memory, and the camera, and configured to control the electronic device,
    wherein the at least one processor, by executing the at least one instruction, is configured to:
        based on determining an operation mode of the electronic device among the plurality of operation modes and based on the hierarchical structure information stored in the non-volatile memory, determine a number of levels of a hierarchical object recognition model corresponding to the determined operation mode and determine one or more object recognition models at each of the plurality of levels of a hierarchical structure of the hierarchical object recognition model corresponding to the determined operation mode,
        load, to the volatile memory, the hierarchical object recognition model having the hierarchical structure corresponding to the determined operation mode, the hierarchical object recognition model including the one or more object recognition models hierarchically arranged based on the number of levels,
        obtain information on an object by inputting an object image obtained through the camera to the hierarchical object recognition model, and
        determine an operation of the electronic device based on the information on the object.

2. The electronic device of claim 1, wherein the at least one processor is further configured to:
    based on determining the operation mode as a first operation mode, load, to the volatile memory, the hierarchical object recognition model including a first level object recognition model, among the plurality of object recognition models, at a first level in the hierarchical object recognition model among the plurality of levels, the first level object recognition model is for identifying whether the object is an avoidance target, and
    identify whether the object is the avoidance target based on feature data of the object obtained by inputting the object image to the first level object recognition model.

3. The electronic device of claim 2, wherein the at least one processor is further configured to:
    based on determining the operation mode as a second operation mode, load, to the volatile memory, the first level object recognition model and at least two second level object recognition models for identifying a type of the object, among the plurality of object recognition models, the at least two second level object recognition models being at a second level lower than the first level in the hierarchical object recognition model among the plurality of levels, and
    identify at least one second level object recognition model to which the feature data of the object is to be input from the first level object recognition model, among the at least two second level object recognition models, based on whether the object is the avoidance target.

4. The electronic device of claim 3, wherein the at least one processor is further configured to identify the type of the object by inputting the feature data of the object obtained through the first level object recognition model to the at least one second level object recognition model.

5. The electronic device of claim 4, wherein the at least one processor is further configured to, based on the identified type of the object, control the electronic device to variously perform an operation corresponding to the second operation mode.

6. The electronic device of claim 4, wherein the at least one processor is further configured to:
    based on determining the operation mode as a third operation mode, load, to the volatile memory, the first level object recognition model, the at least one second level object recognition model, and at least one third level object recognition model, the at least one third level object recognition model being loaded at a third level lower than the second level in the hierarchical object recognition model among the plurality of levels and being capable of recognizing a face of a human, among the plurality of object recognition models.

7. The electronic device of claim 6, wherein the at least one processor is further configured to, based on the identifying the type of the object as the human through the at least one second level object recognition model, identify whether a human face included in the object image is a pre-registered human face by inputting the feature data of the human to the at least one third level object recognition model.

8. The electronic device of claim 1, wherein the at least one processor is further configured to:

based on an image of a new object being obtained through the camera as the object image, determine the operation mode as a learning mode,
obtain feature data of the new object,
determine an object recognition model corresponding to the new object, among the plurality of object recognition models, based on the feature data of the new object and information on the plurality of object recognition models, and
control to train the determined object recognition model and another object recognition model, among the plurality of object recognition models, based on the feature data of the new object, the another object recognition model being connectable as an upper level of the determined object recognition model in the hierarchical object recognition model among the plurality of levels.

9. The electronic device of claim 1, further comprising:
a display,
wherein the at least one processor is further configured to:
based on determining the operation mode as a learning mode, control the display to display a user interface (UI) indicating the plurality of object recognition models,
based on an object recognition model corresponding to a new object being selected through the UI while an image of the new object is obtained through the camera as the object image, obtain feature data of the new object by inputting the image of the new object to the selected object recognition model,
based on a name of a class corresponding to the new object being input by a user, identify the feature data of the new object as data for the class corresponding to the new object for which the name is input, and
control to train the selected object recognition model and another object recognition model, among the plurality of object recognition models, based on the data of the class corresponding to the new object, the another object recognition model being connectable as an upper level of the selected object recognition model in the hierarchical object recognition model among the plurality of levels.

10. A method of controlling an electronic device configured to operate in a plurality of operation modes and including a volatile memory and a non-volatile memory storing a plurality of object recognition models configurable into a hierarchical object recognition model having a hierarchical structure in which the plurality of object recognition models are hierarchically arranged in a plurality of levels, and hierarchical structure information in which each of the plurality of operation modes is associated with a number of levels among the plurality of levels and with one or more object recognition models among the plurality of object recognition models to be disposed at each of the plurality of levels, wherein the number of levels is 2 or more, the method comprising:
based on determining an operation mode of the electronic device among the plurality of operation modes and based on the hierarchical structure information stored in the non-volatile memory, determining a number of levels of a hierarchical object recognition model corresponding to the determined operation mode and determining one or more object recognition models at each of the plurality of levels of a hierarchical structure of the hierarchical object recognition model corresponding to the determined operation mode,
loading, to the volatile memory, the hierarchical object recognition model having the hierarchical structure corresponding to the determined operation mode, the hierarchical object recognition model including the one or more object recognition models hierarchically arranged based on the number of levels;
obtaining information on an object by inputting an object image obtained through a camera to the hierarchical object recognition model; and
determining an operation of the electronic device based on the information on the object.

11. The method of claim 10, wherein the loading further comprises:
based on determining the operation mode as a first operation mode, loading, to the volatile memory, the hierarchical object recognition model including a first level object recognition model, among the plurality of object recognition models, at a first level in the hierarchical object recognition model among the plurality of levels, the first level object recognition model is for identifying whether the object is an avoidance target; and
identifying whether the object is the avoidance target based on feature data of the object obtained by inputting the object image to the first level object recognition model.

12. The method of claim 11, wherein the loading further comprises:
based on determining the operation mode as a second operation mode, loading, to the volatile memory, the first level object recognition model and at least two second level object recognition models for identifying a type of the object, among the plurality of object recognition models, the at least two second level object recognition models being at a second level lower than the first level in the hierarchical object recognition model among the plurality of levels; and
identifying at least one second level object recognition model to which the feature data of the object is to be input from the first level object recognition model, among the at least two second level object recognition models, based on whether the object is the avoidance target.

13. The method of claim 12, further comprising:
identifying the type of the object by inputting the feature data of the object obtained through the first level object recognition model to the at least one second level object recognition model.

14. The method of claim 13, wherein the determining the operation of the electronic device further comprises:
based on the identified type of the object, controlling the electronic device to variously perform an operation corresponding to the second operation mode.

15. The method of claim 13, wherein the loading further comprises:
based on determining the operation mode as a third operation mode, loading, to the volatile memory, the first level object recognition model, the at least one second level object recognition model, and at least one third level object recognition model, the at least one third level object recognition model being loaded at a third level lower than the second level in the hierarchical object recognition model among the plurality of levels and being capable of recognizing a face of a human, among the plurality of object recognition models.

16. The method of claim 15, further comprising:
based on the identifying the type of the object as the human through the at least one second level object recognition model, identifying whether a human face included in the object image is a pre-registered human face by inputting the feature data of the human to the at least one third level object recognition model.

17. The method of claim 16, wherein the determining operation of the electronic device further comprises:
based on the identifying that the human face is not the pre-registered human face, providing an alert message; and
based on the identifying that the human face is the pre-registered human face, controlling the electronic device to move while avoiding the human whose face is identified as the pre-registered human face.

18. The method of claim 10, wherein the loading further comprises:
based on an image of a new object being obtained through the camera as the object image, determining the operation mode as a learning mode;
obtaining feature data of the new object;
determining an object recognition model corresponding to the new object, among the plurality of object recognition models, based on the feature data of the new object and information on the plurality of object recognition models; and
training the determined object recognition model and another object recognition model, among the plurality of object recognition models, based on the feature data of the new object, the another object recognition model being connectable as an upper level of the determined object recognition model in the hierarchical object recognition model among the plurality of levels.

19. The method of claim 10, wherein the loading further comprises:
based on determining the operation mode as a learning mode, displaying a user interface (UI) indicating the plurality of object recognition models;
based on an object recognition model corresponding to a new object being selected through the UI while an image of the new object is obtained through the camera as the object image, obtaining feature data of the new object by inputting the image of the new object to the selected object recognition model;
based on a name of a class corresponding to the new object being input by a user, identifying the feature data of the new object as data for the class corresponding to the new object for which the name is input; and
training the selected object recognition model and another object recognition model, among the plurality of object recognition models, based on the data of the class corresponding to the new object, the another object recognition model being connectable as an upper level of the selected object recognition model in the hierarchical object recognition model among the plurality of levels.

20. A non-transitory computer-readable recording medium having recorded thereon instructions executable by at least one processor to perform operations, wherein a non-volatile memory stores a plurality of object recognition models configurable into a hierarchical object recognition model having a hierarchical structure in which the plurality of object recognition models are hierarchically arranged in a plurality of levels, and hierarchical structure information in which each of a plurality of operation modes of an electronic device is associated with a number of levels among the plurality of levels and with one or more object recognition models among the plurality of object recognition models to be disposed at each of the plurality of levels, wherein the number of levels is 2 or more,
wherein the operations comprise:
based on determining an operation mode of the electronic device among the plurality of operation modes and based on the hierarchical structure information stored in the non-volatile memory, determining the number of levels of a hierarchical object recognition model corresponding to the determined operation mode and determining one or more object recognition models at each of the plurality of levels of a hierarchical structure of the hierarchical object recognition model corresponding to the determined operation mode,
loading, to a volatile memory, the hierarchical object recognition model having the hierarchical structure corresponding to the determined operation mode, the hierarchical object recognition model including the one or more object recognition models hierarchically arranged based on the number of levels;
obtaining information on an object by inputting an object image obtained through a camera to the hierarchical object recognition model; and
determining an operation of the electronic device based on the information on the object.

* * * * *